United States Patent
Kanevsky et al.

(10) Patent No.: US 6,421,453 B1
(45) Date of Patent: Jul. 16, 2002

(54) APPARATUS AND METHODS FOR USER RECOGNITION EMPLOYING BEHAVIORAL PASSWORDS

(75) Inventors: Dimitri Kanevsky, Ossining, NY (US); Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,754

(22) Filed: May 15, 1998

(51) Int. Cl.⁷ .................................................. G06K 9/00
(52) U.S. Cl. ....................................... 382/115; 340/5.2
(58) Field of Search ................................. 382/115, 116, 382/117, 118, 119, 120–124; 235/380, 492; 704/208, 246, 273, 250; 902/3, 4, 25; 348/161; 340/5.2, 5.52, 5.53, 5.54, 5.8, 5.81, 5.82, 5.83

(56) References Cited

U.S. PATENT DOCUMENTS

| | | | |
|---|---|---|---|
| 5,502,774 A | | 3/1996 | Bellegarda et al. |
| 5,526,465 A | * | 6/1996 | Carey et al. ................. 704/250 |
| 5,553,119 A | * | 9/1996 | McAllister et al. ...... 379/88.01 |
| 5,687,254 A | * | 11/1997 | Poon et al. .................. 382/229 |
| 5,761,329 A | * | 6/1998 | Chen et al. .................. 382/116 |
| 5,787,187 A | * | 7/1998 | Bouchard et al. ........... 382/115 |
| 5,825,921 A | * | 10/1998 | Dulong ........................ 382/181 |
| 5,838,306 A | * | 11/1998 | O'Connor et al. .......... 345/163 |
| 6,006,175 A | * | 12/1999 | Holzrichter ................. 704/208 |
| 6,101,264 A | * | 8/2000 | Wagner et al. .............. 382/115 |
| 6,163,616 A | * | 12/2000 | Feldman ...................... 382/115 |

* cited by examiner

Primary Examiner—Samir Ahmed
(74) Attorney, Agent, or Firm—F. Chau & Associates, LLP

(57) ABSTRACT

A method for controlling access of an individual to one of a computer and a service and a facility comprises the steps of: pre-storing a predefined sequence of intentional gestures performed by the individual during an enrollment session; extracting the predefined sequence of intentional gestures from the individual during a recognition session; and comparing the pre-stored sequence of intentional gestures to the extracted sequence of intentional gestures to recognize the individual.

53 Claims, 14 Drawing Sheets

APPARATUS AND METHODS FOR USER RECOGNITION EMPLOYING BEHAVIORAL PASSWORDS

BACKGROUND OF THE INVENTION

1. Technical Field

The present invention relates to methods and apparatus for user recognition (classification/identification/verification) to grant access or service to authorized users and, more particularly, to methods and apparatus for providing same employing gesture recognition, speaker recognition, and additional biometric and/or non-biometric features.

2. Discussion of Related Prior Art

Natural computing is a relatively new field which is becoming increasingly popular. In a natural computing system, a display screen, preferably a giant screen covering a wall, is located in front of a user. Conventional input devices (i.e., user interfaces), such as a mouse and keyboard, may be completely eliminated through the use of voice commands and/or gestures. That is, gestures such as pointing fulfill the pointing and clicking roles of the mouse while speech provides the command and control inputs.

Consequently, these relatively new user interfaces dramatically impact the transactions between users and computers. Remote transactions between a user and computer, similar to that between a user and television set via a remote control, may be realized. Accordingly, it would be desirable and highly advantageous to utilize gestures to not only provide command and control inputs to the computer, but also to recognize individuals attempting to utilize the computer in the first place in order to restrict access to authorized users.

In a natural computing environment, user recognition (classification, identification, and verification) is a paramount concern. To illustrate this, consider the following example. Three individuals are attempting to simultaneously interface with a computer that controls a truck manufacturing facility through either voice commands or gestures. The first individual is an unauthorized user, the second individual is a data entry person desiring to simply enter data of a non-urgent nature, and the third individual is a supervisor desiring to immediately initiate a power shutdown of a particular assembly line before a catastrophic event occurs (e.g., he has observed a severe stress crack in an automatic lift which is about to raise a truck off the ground for further assembly).

In such a situation, it would be desirable for the computer to classify, identify, and verify the individuals. Classification involves the differentiation of multiple individuals simultaneously attempting to interact with the system. Individuals must be differentiated so that each command provided to the computer is associated to a particular individual. This is because the same command (e.g., word, phrase, gesture) may have different meanings from one individual to the next. Next, the computer must be able to identify the individuals from their respective commands (or through an imaging system, etc.) without reception of an identity claim (i.e., indicia supplied by the individual to initially identify the individual). Then, the computer must verify that the individuals are indeed authorized to access the computer (prior to executing any offered commands). Further, in this example, it would be desirable to implement an extension of the identification task where the individuals attempting to interface with the computer are ranked so that a higher ranking individual (i.e., the supervisor) is allowed access over a lower ranked individual (i.e., the data entry person). If all these steps are properly performed, the computer will process the command from the supervisor to shutdown power before any commands from the data entry person are processed. Further, the computer will ignore any commands from the first individual (i.e., the unauthorized user). Thus, as the example illustrates, user recognition (classification, identification, and verification) is a significant factor in a natural computing environment.

Currently, there are several techniques and apparatus for recognizing an individual. They have been significantly implemented in systems which verify the identity of an individual requesting access to a service or facility in order to determine if in fact the individual is authorized to access the service or facility. In such situations, users typically have to write down, type or key in (e.g., on a keyboard) certain information in order to send an order, make a request, obtain a service, perform a transaction or transmit a message.

Verification or authentication of a customer prior to obtaining access to such services or facilities typically relies essentially on the customer's knowledge of passwords or personal identification numbers (PINs). However, such conventional user verification techniques present many drawbacks. First, passwords and pins selected by the user are usually based on some personal aspect of the user's life, such as, for example, their mother's maiden name or child's birthday. A seasoned perpetrator intent on committing fraud can usually decipher/determine user selected passwords and pins fairly easily. In the case where the password or PIN is provided to the user without his input, such measures are generally not reliable mainly because the user is usually unable to remember this information or because many users write the information down thus making the fraudulent perpetrator's job even easier. For instance, it is known that the many unwitting users actually write their PINs on the back of their ATM or smart card. Additionally, advances in technology have made it easier for a perpetrator to fraudulently obtain a password or PIN. For example, a perpetrator may view a transaction between a user and an ATM via binoculars or other enhanced viewing device (e.g., night vision goggles) in order to obtain the user's PIN. Similarly, an enhanced audio obtaining device (e.g., miniaturized audio amplifiers that resemble hearing aids) may used to fraudulently overhear and thus obtain a password.

Similarly, user verification techniques employing items such as keys, ID cards, and ID cards with embedded PINs also present many drawbacks. For example, such items may be stolen or lost and subsequently fraudulently used. This is especially true when a perpetrator obtains such items by stealing a wallet or pocketbook where other information may be contained therein informing the perpetrator where the key or card can be used (e.g., the location of the victim's bank, ATM, etc.). Additionally, such items are not easily utilized by children. Also, they are difficult to change periodically which may be desirable from a security point of view.

The shortcomings inherent with the above-discussed security measures have prompted an increasing interest in biometric security technology, i.e., verifying a person's identity by personal biological characteristics. Several biometric approaches are known, such as, for example, the recognition of voice print, facial bone structure, signature, face temperature infrared pattern, hand geometry, writing instrument velocity, writing instrument pressure, fingerprint, and retinal print, to name a few.

However, conventional biometric approaches also present drawbacks. For example, they are not 100% foolproof as several people (e.g., twins) can have the same voice print or same face. Additionally, conventional biometrics are not transferable and thus, for example, cannot be transferred to a friend to allow her access to a home. Also, they cannot be changed if a higher level of security is required. Furthermore, conventional biometrics are not always conveniently furnished such as in the case where weather conditions make it prohibitive to remove one's gloves in order to provide a fingerprint to gain access to a facility. Moreover, they are not constant, as a person can, for example, cut a finger (affecting their fingerprint) and age (affecting, e.g., their bone structure scan). These drawbacks not only impact recognition systems for accessing a service or facility but also affect the recognition functions required in a natural computing environment.

Accordingly, it would be desirable and highly advantageous to provide apparatus and methods for facilitating user classification/identification/verification in a natural computing environment. Moreover, it would be desirable and highly advantageous to provide apparatus and methods for transferring the biometrics of a user to at least one other user. Additionally, it would be desirable and highly advantageous to provide apparatus and methods for conveniently extracting biometrics from a user.

SUMMARY OF THE INVENTION

In one aspect of the present invention, a method for controlling access of an individual to one of a computer and a service and a facility comprises the steps of: pre-storing a predefined sequence of intentional gestures performed by the individual during an enrollment session; extracting the predefined sequence of intentional gestures from the individual during a recognition session; and comparing the pre-stored sequence of intentional gestures to the extracted sequence of intentional gestures to recognize the individual. The gestures include touching an object, touching a body part, and performing a step.

In a first embodiment, the method further comprises the steps of: pre-storing one or more characteristics corresponding to the performance of the predefined sequence of intentional gestures performed during the enrollment session; extracting the one or more characteristics from the individual during the recognition session; and comparing the pre-stored characteristics to the corresponding extracted characteristics to recognize the individual. The characteristics include the speed of performing at least one gesture of the gesture sequence, the speed of transitioning from a first gesture to a second gesture, and the speed of performing the entire gesture sequence.

In a second embodiment, the method further comprises the steps of: pre-storing at least one unintentional gesture associated with, and performed during, the performance of the intentional gesture sequence of the enrollment session; extracting the at least one unintentional gesture from the individual during the recognition session; and comparing the pre-stored at least one unintentional gesture to the extracted at least one unintentional gesture to recognize the individual.

In a third embodiment, the method further comprises the steps of: pre-storing one or more biometric features corresponding to the individual during the enrollment session; extracting the one or more biometric features from the individual during the recognition session; and comparing the pre-stored biometric features to the extracted biometric features to recognize the individual. The biometrics features include, for example, voice print, face recognition, signature recognition, face temperature infrared pattern, lip reading, writing instrument velocity, writing instrument pressure, fingerprint, retinal print, body geometry, and body part geometry.

In a fourth embodiment, the method further comprises the steps of: pre-storing one or more non-biometric features corresponding to the individual during the enrollment session; extracting the one or more non-biometric features from the individual during the recognition session; and comparing the pre-stored non-biometric features to the extracted non-biometric features to recognize the individual. The non-biometric features include, for example, a password, a personal identification number (PIN), and personal information.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
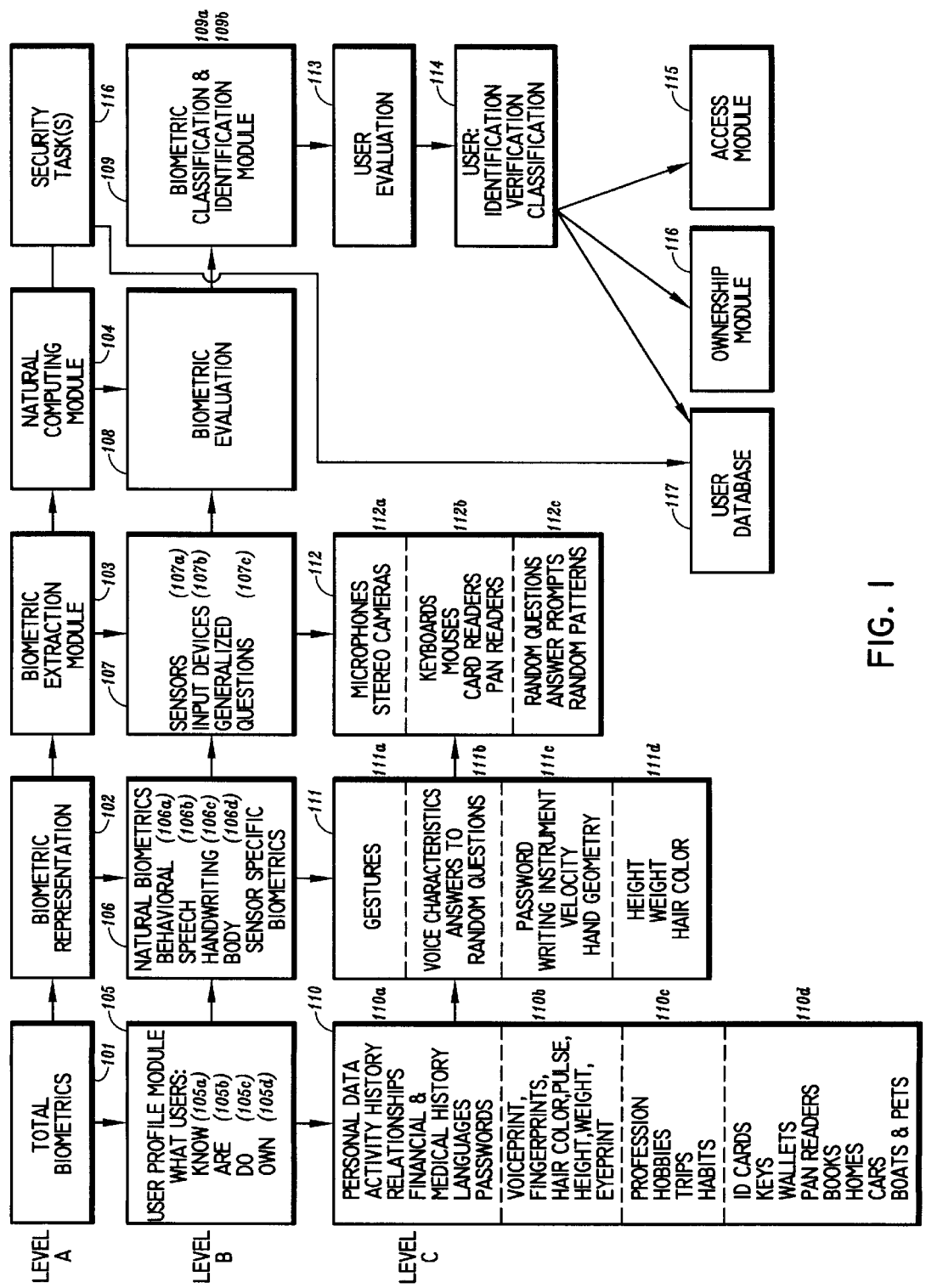
FIG. 1 is a block/flow diagram illustrating the concept of Total Biometrics and its application to security tasks according to an embodiment of the invention.

The present invention facilitates user classification/identification/verification in a natural computing environment. However, it also may be advantageously implemented to any scenario where an intended user must be identified and verified prior to performing, or being allowed to perform, a certain act (e.g., access a service or facility). Further, the invention may be utilized to identify and verify an individual prior to providing the individual with an object, such as a paycheck or other goods. According to the invention, an individual is recognized based on the use of a behavioral password which consists of a sequence of intentionally performed gestures. The password may also include intentionally produced sounds, unintentionally produced gestures and sounds, and characteristics associated therewith. Moreover, additional biometric and/or non-biometric features, information and objects (e.g., proof of possession) as described herein may utilized to recognize an individual in accordance with the invention. Also, the invention allows for the processing of multiple commands issued simultaneously from multiple users, the processing of the same command from multiple users where the command has a different meaning to each of the users, and the customization of a natural computer and/or service to the specific preferences of each user. Given the teachings of the invention provided herein, one of ordinary skill in the related art will be able to contemplate these and various other implementations of the invention.

The term classification as used herein involves the differentiation of multiple users simultaneously attempting to interact with the system and/or the clustering of each user according to different criterion (e.g., similar height, gender, hair color, age, etc.). The term identification means the recognition of a user without reception of an identity claim (i.e., indicia supplied by the user to initially identify the user). That is, the user is identified upon simply presenting himself or herself before the computer (via, for example, an imaging system such as a stereo camera system). The identification of an individual may be applied to configure a natural computer based on the user's preferences and commands. The term verification as used herein involves an identity claim and the acceptance or rejection of this claim. The result of a verification is applied to grant/deny access to the computer system.

In order to facilitate an understanding of the invention, an overview of the concepts involved in the recognition of an individual are hereinafter described. According to the invention, an individual may be recognized via the use of a behavioral password. The password includes a sequence of intentionally performed gestures (hereinafter referred to as "gesture pins") which are extracted, processed and compared to corresponding pre-stored data. As an example, a gesture pin may consist of the following three gestures: touch one's nose, step forward, and step directly to the left. Additionally, unintentional gestures or movements occurring during the performance of a gesture pin may be incorporated into a behavioral password. However, for such movements to be incorporated into a password, they must either be expected to occur (e.g., reflexive) or be detected to occur with a sufficient frequency (e.g., habit). For example, perhaps a particular user habitually bends his head down every time he touches his nose. This unintentional act may be incorporated into his corresponding behavioral password so that every time he performs the above defined gesture pin, the unintentional gesture (of bending his head down) is also extracted, processed and compared to corresponding pre-stored data. Moreover, characteristics corresponding to the performance of both intentionally and unintentionally performed gestures may be incorporated into a behavioral password. For example, the speed associated with the performance of individual gestures making up a gesture pin, or the speed of transitioning from one gesture to another may be extracted, processed and compared to corresponding pre-stored data.

Behavioral passwords may also include sounds produced either intentionally or unintentionally. The sounds may be generated from artificial (non-human) means such as synthesized sounds or may simply result from tapping an object. In the case of synthesized sounds, preferably they are outside the range of human hearing and thus, their generation during a recognition session could conceivably be undetected by a fraudulent perpetrator. However, it is preferred that the sounds are generated from a human subject and further, that they form speech having acoustic and non-acoustic characteristics associated therewith. In any case, the sounds are extracted, processed, and compared to corresponding pre-stored data. Similar to unintentional gestures, unintentional sounds must either be expected to occur (e.g., reflexive) or be detected to occur with a sufficient frequency (e.g., habit) to be incorporated into a password. Additionally, and especially in the case of speech, characteristics corresponding to the performance of the sounds (for both intentionally and unintentionally produced sounds) may be incorporated into a behavioral password. For example, with respect to speech, acoustic characteristics such as accent, stress, and the spacing between utterances may be extracted, processed and compared to corresponding pre-stored data. Non-acoustic characteristics such as the content of an oral answer to a prompted question or a particular conventional password (not to be confused with behavioral password) may be similarly treated. The phrase "conventional password" is hereinafter used to refer to a password consisting of a word (or group of words) that is spoken during a recognition session to verify a user's knowledge of that particular word.

The incorporation of sounds in a behavioral password, particularly speech, allows for the use of any speaker recognition system. Speaker recognition can be performed in text-dependent or text-prompted mode (where the text of an utterance is prompted by the speech recognizer and recognition depends on the accuracy of the words uttered as compared to the prompted text), or text-independent mode (where the utterances of the speaker are used to perform recognition by comparing the acoustic characteristics of the speaker with acoustic models of previously enrolled speakers, irrespective of the words uttered). However, it is preferable if text-independent speaker recognition is employed over text-dependent or text-prompted speaker recognition because text independence allows the speaker recognition function to be carried out in parallel with other recognition-based functions (e.g., content analysis, gesture recognition) in a manner transparent to a user and for a plurality of concurrent users at differing access levels without requiring interruption for new commands or identification of a system user whenever a new user is encountered. However, while text-independent speaker recognition systems are preferred, it is to be understood that the present invention may be employed with any speaker recognition system and is not, in any way, limited to use with or dependent on any details or methodologies of any particular speaker recognition arrangement with which the invention may be described herein.

In addition to the use of behavioral passwords to recognize an individual, the invention also contemplates the concurrent use of additional biometric and/or non-biometric features. The use of additional features provides an added measure of security with regard to computer/facility/service access. Examples of such biometric features include facial bone structure, signature, face temperature infrared pattern, hand geometry, writing instrument velocity, writing instrument pressure, fingerprint, and retinal print, to name a few. These and other biometric features pertaining to a particular user may also be stored in user profile database. Some examples of non-biometric features have been provided above with respect to the implementation of sound recognition. However, other non-biometric features may also be implemented to recognize a user which are not embodied in speech. For example, the keying or typing of a conventional password or a PIN may also be used in conjunction with the use of a behavioral password. It is to be appreciated that the actual act of typing a conventional password or PIN consists of a sequence of intentional gestures which may be performed as part of a gesture pin.

Moreover, recognition according to the invention may include what is hereinafter referred to as proof of possession. The proof of possession is when an individual is in possession of a specific object, and the object is known to be associated with the individual or can be confirmed to be associated with the individual. That is, the fact that the individual possesses the specific object makes it more likely than not that that individual is the person to whom the object is known to be associated with. For example, an individual may present/display a social security card, credit card, etc., during a recognition session to further supplement indicia supplied by him. The fact that the name on the card says John Smith makes it more likely than not that the person presenting/displaying the card is John Smith. Taken alone, this verification technique may be defeated in circumstances where a person is in fraudulent possession of a stolen card or other item. However, taken in combination with the techniques described herein pertaining to behavioral passwords and the other recognition means, the proof of possession provides another useful supplement in recognizing an individual.

Thus, to summarize what was disclosed above, an individual may be recognized in accordance with the invention based on behavioral passwords (i.e., a sequence of intentionally performed gestures, and optionally, unintentional gestures and sounds, and intentional sounds), additional biometric and/or non-biometric features, and the proof of possession. Given the broad span of user associated indicia which may be embodied by the invention to recognize an individual, such indicia may be hereinafter collectively referred to using the phrase "total biometrics". Thus, this phrase is deemed to include all indicia attributable to an individual from which the individual may be recognized. It is to be appreciated that as the number of recognition techniques employed to recognize an individual increases, the accuracy of the corresponding recognition also increases.

The indicia embodied by the concept of total biometrics may be segmented into various categories such as, for example, what users know (user knowledge); user actions (what user do); user possessions (what users own); and what users are (individual characteristics). According to the invention, indicia corresponding to the aforementioned categories are extracted from an individual during an enrollment session and pre-stored in a user profile database. At a subsequent recognition session when the user is seeking access to a computer/service/facility, the indicia is again extracted from the user, and then compared against the indicia pre-stored in the user profile database. If there is a match between the pre-stored indicia corresponding to the enrollment session and the subsequently extracted indicia corresponding to the recognition session, the individual is considered recognized. It is to be appreciated that the gestures and sounds that are to be required of the user during a recognition session may be either predefined without input from the user or made up by the user himself. In either case, the gestures and sounds must still be extracted from the user during an enrollment session for comparison in a subsequent recognition session.

In order to facilitate an understanding of the concepts referenced above pertaining to user recognition, two illustrative embodiments of the invention implementing simple to behavioral passwords will be hereinafter described. The following illustrative embodiments show how a behavioral password consisting of a sequence of intentionally produced gestures (i.e., a gesture pin) can be used for access control. With respect to both illustrative embodiments, consider that an individual seeks to gain access/entry to a computer/service/facility which implements gesture recognition. The individual produces a sequence of gestures. He may, for example, touch a part of his body such as his forehead or an object such as a picture on a wall, or he may perform certain steps such as one step forward and two steps back. These gestures may be filmed by one or more cameras and subsequently mapped into behavioral patterns (hereinafter referred to as a "decoded gesture pin"). The decoded gesture pin is matched against a user pins database (which is a database of prototypes for decoded gesture pins or "behavioral pins") and a decision based on this match is made to determine whether or not to grant/deny access/entry.

These gesture pins are especially convenient for accessing buildings in cold winters since they do not require taking off gloves to handle access cards or furnish fingerprints. Furthermore, certain gesture pins according to the invention can be performed in such a way that they cannot be readily intercepted by a fraudulent perpetrator. For example, according to a first illustrative embodiment of the invention, a user may move his tongue inside his mouth in a sequence of gestures (e.g., swirls, up, down, side to side), whereby ultrasound techniques are used to detect the sequence of gestures. The detected sequence of gestures is mapped (into a decoded gesture pin) and compared against a behavioral pin (i.e., user pin) stored in a database of prototypes for behavioral pins in order to verify the user. Thus, by having the user perform the required gestures within his own mouth, a perpetrator is prevented from observing the sequence of patterns (gesture pin) performed by the user (or portions thereof). In fact, the perpetrator may even be unaware that the user performed or provided anything pertaining to access control.

According to the second illustrative embodiment of the invention, a user may perform a sequence of gestures consisting of hand signals (at which time he may keep his gloves on). However, during the performance, the user's hand is placed in an enclosed box having an inlet which blocks the view inside the box when a hand is placed therein. Recognition techniques employing, for example, thermal imaging or ultrasound may be used to detect the sequence of gestures. The detected sequence of gestures is mapped and compared against the user pins database in order to verify the user. This embodiment also prevents a perpetrator from observing the sequence of gestures (gesture pin) performed by the user (or portions thereof).

It is to be appreciated that the implementation of gesture pins may incorporate various data, apparatus, and techniques. For example, statistical data may used to distinguish between typical and rare gestures. The desired level of security determines what type of gesture sequences are acceptable. Thus, gesture pins consisting of highly probable gesture sequences (i.e., scratching one's head) should not be used where a high degree of security is required. Additionally, different statistical gesture distributions may be considered for different ages (e.g., children prefer funny gestures/movements). Further, tracking devices and methods may be utilized to trace body movements in order to detect when a gesture or sequence of gestures has occurred (e.g., some body part was touched). Moreover, methods/apparatus may be utilized to segment gestures and distinguish "noise" movements from movements that are used to classify/identify/verify the user. Noise movements are gestures that a person may produce which are not part of a gesture pin nor associated with the gesture pin (i.e., not a result of reflex or habit). They occur sporadically and do not affect or invalidate the gesture recognition process.

It is to be appreciated that the invention is primarily directed to the utilization of behavioral passwords consisting of intentionally produced gesture sequences (gesture pins) and, to a lesser degree, to unintentionally produced gestures performed during the gesture pin and characteristics associated with both types of gestures (intentional and unintentional). However, the invention is also contemplated to include, when desired, sounds (particularly speech) as part of the behavioral password as well as the implementation of additional biometric and/or non-biometric features and the proof of possession to provide additional means for recognizing an individual.

FIG. 1 is a block/flow diagram illustrating the concept of Total Biometrics and its application to security tasks according to another embodiment of the present invention. Such tasks could include providing access control in a natural computing environment as well as access control to a service, facility, or goods. Various levels having varying degrees of detail are depicted. It is to be understood that many of the elements depicted in FIG. 1 overlap and are closely related. It is to be further understood that the remaining figures included herein are related to the elements shown in FIG. 1 and, in most cases, further explain the elements of FIG. 1 or a subsequent figure thereto. Additionally, many of these figures are, similar to FIG. 1, considered both a block diagram of apparatus for carrying out the invention as well as a flow chart. That is, the depicted elements may be characterized as steps of a method or as modules for performing the described steps. Thus, the elements illustrated in the various figures may be implemented in various forms of hardware, software, or combinations thereof. As such, the main recognition elements (e.g., the gesture recognition module) are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 and the subsequent figures thereto may be considered to include a suitable and preferred processor architecture for practicing the invention which may be achieved by programming the one or more general purpose processors. Of course, special purpose processors may be employed to implement the invention. Given the teachings of the invention provided herein, one of ordinary skill in the related art will be able to contemplate these and various other implementations of the elements of the invention.

The first level of FIG. 1, which is the most general or basic level (i.e., level A), illustrates that total biometrics 101 can have different biometrics representations 102 associated therewith that are detected and obtained by a biometrics extraction module 103 and processed by a natural computing module 104 to fulfill a security task(s) 116. The second level (i.e., level B) characterizes the elements depicted in the first level with general examples that are described in more detail in the third level (i.e., level C). It is to be appreciated that the examples in the second and third levels (i.e., levels B and C) are provided for illustrative purposes in order to facilitate a clear understanding of the present invention. Accordingly, it is to be further appreciated that the present invention is not limited to the particular examples provided and that one of ordinary skill in the art will contemplate many other implementations given the teachings described herein.

Associated with the second level, a user profile module 105 illustrates that Total Biometrics 101 may be split into the following categories: what users know (user knowledge) 105a; what users are (individual characteristics) 105b; what users do (user actions) 105c; and what users own (user possessions) 105d. These categories (105a–d), which overlap and are closely related, are described in further detail in subsections 110a–d load of block 110, respectively.

User knowledge (what users know) 105a includes data personal to the user, the history of the user's activities, relationships with other people, financial and medical history, languages known by the user, and passwords (110a). Individual characteristics (what users are) 105b are generally "observable" in that they may be observed/extracted via sensors such as cameras and microphones. Some examples of individual characteristics are voice print, fingerprints, hair color, pulse, height, weight, and eye print (110b). User actions (what users do) 105c are also observable and include user behavior such as gestures (110c). User possessions (what users own) 105d include items for gaining access to a service/facility (e.g., ID cards, and keys), personal items (e.g., wallets, PAN (personal area network) readers, and books), properties (e.g., homes, cars, and boats), and pets (110d).

Biometric representation 102 may occur in many forms. However, for the purposes of the invention, biometric representations may be considered to fall within two broad categories. The first category is hereinafter referred to as natural biometrics and is defined to include biometric features of a user which can be extracted via a natural computing interface (i.e., the interface between the computer and the user in a natural computing environment such as, for example, a microphone and camera imaging system and, possibly a keyboard and a mouse). The second category is hereinafter referred to as sensor specific biometrics and is defined to include biometric features of a user which cannot be extracted via a natural computing interface. That is, the second category corresponds to biometric features that are extracted via additional, special sensors and not those sensors or interfaces generally present in a natural computing environment. For example, the extraction of biometric features such as infrared face temperature and retinal print require sensors other than those specified above. It is to be appreciated that the invention may be implemented to recognize an individual based on a combination of features from both categories (i.e., natural and sensor specific biometrics). Such a combination may result from the conventional method of simply combining the score of the individual mutually exclusive recognition techniques corresponding to each feature or by synchronizing multiple features as described in further detail below with respect to FIG. 8.

Speech biometrics 106b include combinations of acoustic and non-acoustic features, such as voice characteristics and answers to random questions (111b). It is to be appreciated that the answers to the questions do not necessarily have to be spoken; the answers can be written, drawn, verified (as described hereinbelow), or mimed (i.e., gestures). An example of a speaker recognition system which performs text-independent speaker verification and asks random questions is described in U.S. Pat. No. 5,897,616, filed on Jun. 11, 1997, and entitled "Apparatus and Methods for Speaker Verification/Identification/Classifying Employing Non-Acoustic and/or Acoustic Models and Databases", the disclosure of which is incorporated herein by reference. In one embodiment of such a speaker recognition system, users of a service/facility are previously enrolled such that acoustic models of their voice characteristics are generated and stored in an acoustic database. Furthermore, non-acoustic information (specific to each user) is generated and stored in a non-acoustic database. On a subsequent occasion when a user requests access, he is queried with a random question (or multiple random questions). Based on a comparison of his utterances at that time with the previously stored acoustic and non-acoustic information (i.e., the answer(s) to the random question), the user is denied or granted access. That is, the user is granted access if both his voice characteristics and the answer to the random question substantially match the acoustic and non-acoustic information stored in the databases. The resulting system is a combination of text-independent speaker recognition, speech recognition and natural language understanding.

Behavioral biometrics 106a include "observable" behavior such as gestures (111a). The utilization of gestures as behavioral passwords is discussed in further detail with reference to FIG. 5.

Speech biometrics 106b include combinations of acoustic and non-acoustic features, such as voice characteristics and answers to random questions (111b). It is to be appreciated that the answers to the questions do not necessarily have to be spoken; the answers can be written, drawn, verified (as described hereinbelow), or mimed (i.e., gestures). An example of a speaker recognition system which performs text-independent speaker verification and asks random questions is described in U.S. Ser. No. 08/871,784, filed on Jun. 11, 1997, and entitled "Apparatus and Methods for Speaker Verification/Identification/Classifying Employing Non-Acoustic and/or Acoustic Models and Databases", the disclosure of which is incorporated herein by reference. In one embodiment of such a speaker recognition system, users of a service/facility are previously enrolled such that acoustic models of their voice characteristics are generated and stored in an acoustic database. Furthermore, non-acoustic information (specific to each user) is generated and stored in a non-acoustic database. On a subsequent occasion when a user requests access, he is queried with a random question (or multiple random questions). Based on a comparison of his utterances at that time with the previously stored acoustic and non-acoustic information (i.e., the answer(s) to the random question), the user is denied or granted access. That is, the user is granted access if both his voice characteristics and the answer to the random question substantially match the acoustic and non-acoustic information stored in the databases. The resulting system is a combination of text-independent speaker recognition, speech recognition and natural language understanding.

Handwriting biometrics 106c include combinations of handwriting and non-handwriting features. For example, features associated with a writing generated by a user's hand include a password(s) embodied in the writing itself, writing instrument velocity, and hand geometry 111c.

Body biometrics 106d include body characteristics such as height, weight, and hair color. These biometrics are obtained by first extracting images of a user via a camera imaging system. Thereafter, simple geometric techniques may be used to measure morphological characteristics such as (height, width, etc.), and simple signal processing can be used to determine skin and eye color, etc. As such techniques are known in the art, further details associated therewith are not provided. It is to be appreciated that an individual need not provide an identity claim in order to identify himself since he may be identified from his morphological characteristics (face topology, height, eye and hair color, etc.).

Biometric extraction 103 of basic user features may be performed via sensors 107a that include microphones and stereo cameras (112a), or input devices 107b that include keyboards, mouses, card readers, and PAN readers (112b). Additionally, biometrics may be extracted via generalized questions 107c that include random questions or answer prompts and random patterns 112c which are asked/provided to verify the user's knowledge of certain information. The use of random questions to provide secure access control is described in U.S. Pat. No. 5,774,525, filed Jan. 23, 1995, and entitled "Method and Apparatus Utilizing Dynamic Questioning to Provide Secure Access Control", the disclosure of which is incorporated herein by reference. The use of answer prompts and random patterns to provide secure access control is described in U.S. Ser. No. 09/063,805, entitled "Random Visual Patterns Used to Obtain Secured Access", filed Apr. 20, 1998, the disclosure of which is incorporated herein by reference. The inventions of both U.S. Pat. No. 5,774,525 and U.S. Ser. No. 09/063,805 are described in further detail hereinbelow with respect to FIG. 2.

A natural computing module 104 evaluates the user biometrics that were extracted by biometric extraction module 103. This biometric evaluation 108 requires classification 109a of user biometrics as intentional or unintentional, and identification 109b of what combination of biometric sources are involved (described in further detail with respect to FIG. 4).

On the basis of the biometric classification and identification 109, user evaluation 113 is performed. User evaluation 113 includes (see block 114) user identification, user verification, and user classification (the latter including user separation and user clustering). Depending on the security task(s) 116 involved and the results of the user evaluation 113, the user is either: granted/denied access to a service/facility 115; confirmed/denied with respect to ownership of an item (proof of possession) 116; or information pertaining to the user's biometrics will be stored in a user database 117 for different applications (or for later secured proceedings).

Figure 2:
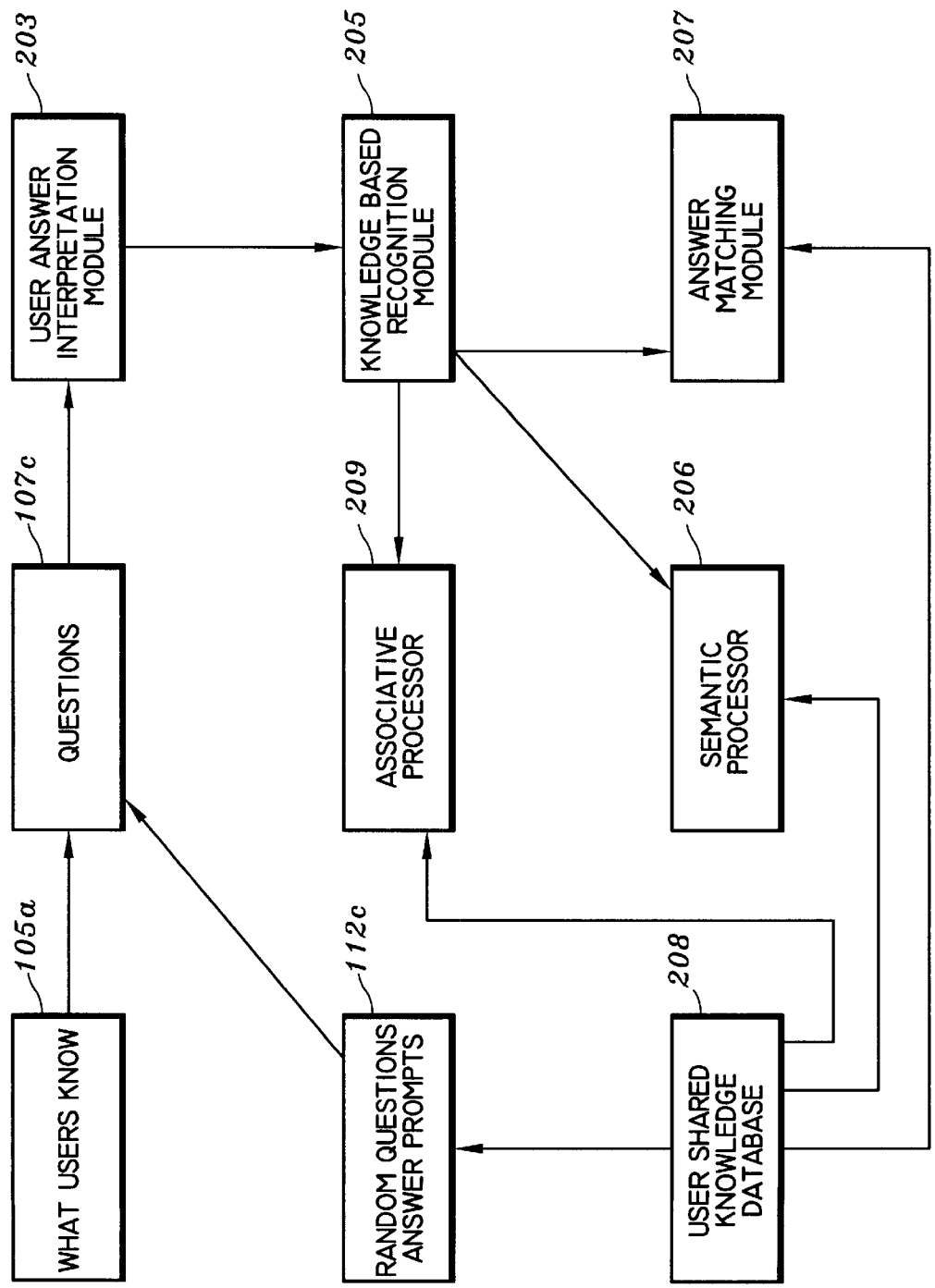
FIG. 2 is a block/flow diagram illustrating user knowledge processing according to an embodiment of the invention.

FIG. 2 is a block/flow diagram illustrating user knowledge processing according to an embodiment of the present invention. User knowledge (what users know) 105a is evaluated via iterative means. The knowledge 105a is extracted from the user via questions 107c. The questions are utilized to determine whether or not the user has knowledge of information that is stored in a user shared knowledge database 208. The database 208 includes data that the user has shared with a security provider (e.g., a security access server), such as data personal to the user, the history of the user's activities, relationships with other people, financial and medical history, and languages known by the user (110a). In order to obtain information about the user, the user may be asked random questions, or furnished with answer prompts and/or random visual patterns 112c.

A security setup based on random questions is described in U.S. Pat. No. 5,774,525 referenced above. According to one embodiment of the invention of U.S. Pat. No. 5,774,525, a system that controls access to a service or facility according to answers provided by a user in response to questions asked of the user includes a data base for storing dynamic data. A first module generates at least one question based upon the dynamic data stored in the data base, and a communication device communicates to the user the question(s) generated by the first module. A receiving device receives a response associated with the question(s), and a second module interprets the response to determine whether or not the response conforms to the dynamic data upon which the associated question(s) is based. A system control module outputs an authorization status indicating whether or not the user is authorized for access according to the determination made by the second module. The utilization of dynamic data as the basis of the questions asked of the user allows the system to protect against eavesdroppers attempting to gain access to the service or facility.

A security setup based on answer prompts and random visual patterns is described in U.S. Ser. No. 09/063,805 referenced above. According to one embodiment of the invention of U.S. Ser. No. 09/063,805, a method for obtaining secured access includes presenting a user (person accessing secured data, goods, services, and/or information) with one or more images and/or portions of images. As a security check, the user selects one or more of the images, possibly in a particular order. The set of selected images and/or the order is then compared to a set of images known to an agent (e.g., stored in a memory of a bank) that is associated with the user. If the sets match, the user passes the security check. Typically, the images and/or image portions are familiar to the user, preferably familiar to the user alone, so that selection and/or sequence of the images/portions would be easy for the user but unknown to anyone else.

A user answer interpretation module 203 interprets user answers. The interpretation module 203 utilizes a knowledge based recognition module 205 that may further utilize a semantic processor 206 to analyze the meaning of answers provided by the user, or an answer matching module 207 if the user responds to the questions 107c via answer prompts. The knowledge based recognition module 205 also utilizes an associative processor 209 which associates the answers (or choices) provided by the user with facts corresponding to the user's life. Examples of such associations are provided in U.S. Ser. No. 09/063,805 referenced above.

Figure 3:
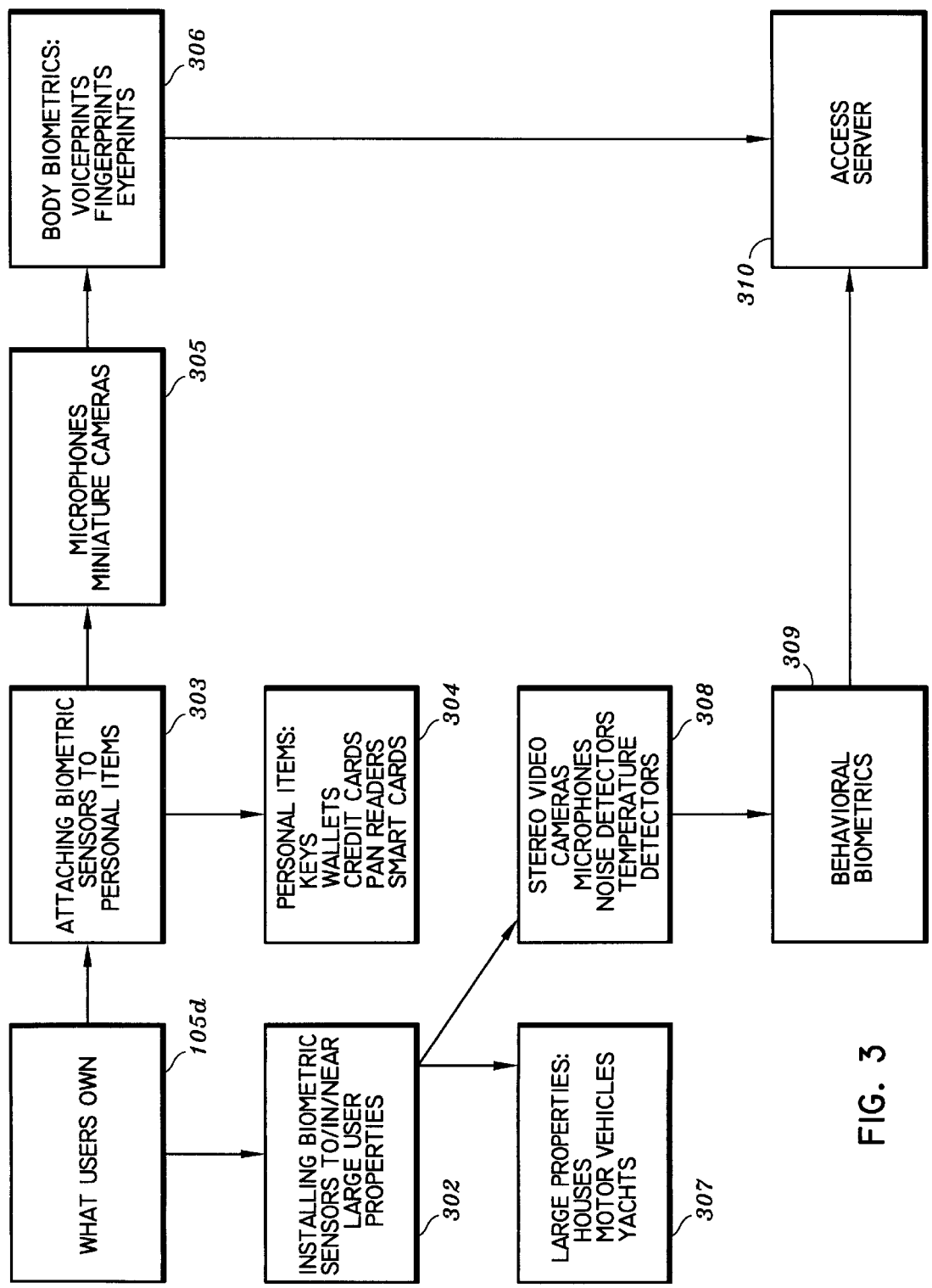
FIG. 3 is a flow diagram illustrating a method for user ownership verification according to an embodiment of the invention.

FIG. 3 is a flow diagram illustrating a method for user ownership verification according to an embodiment of the present invention. User ownership pertains to what users own (user possessions) 105d. The method can be roughly divided into two approaches for providing proof of user ownership. The first approach is directed to large properties 307 associated with the user, and the second approach is directed to small (personal) items 304 associated with the user.

For relatively large user properties 307 such as houses, businesses, motor vehicles, and boats, biometric sensors such as stereo video cameras, microphones, noise detectors, and temperature detectors 308 may be installed 302 to, in, or near such properties. Through the use of these sensors an individual who attempts to use an item (or enter a building/vehicle/boat) can be detected, his or her behavioral biometrics 309 extracted (as described above), and the extracted biometrics provided to an access server 310.

In the case of personal items 304 which are relatively small in size (such as, for example, keys, digital wallets, credit cards, PAN readers, and smart cards), biometric sensors can be attached 303 to these items (such as microphones and miniature cameras 305) for extracting body biometrics 306 (e.g., voice, finger, and eye prints). The extracted biometrics can then be provided to the access server 310 for security processing.

Figure 4:
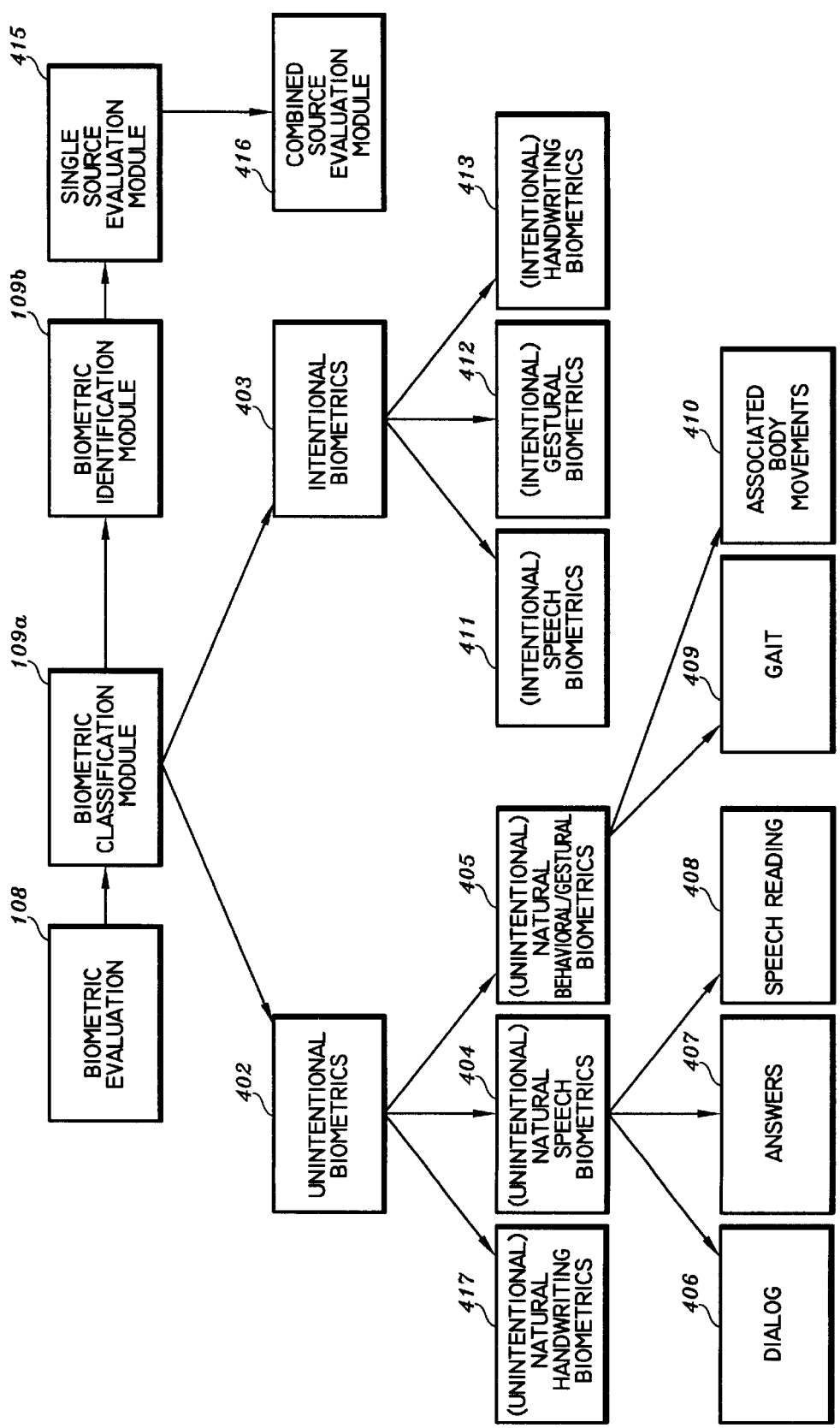
FIG. 4 is a block/flow diagram illustrating biometric evaluation according to an embodiment of the invention.

FIG. 4 is a block/flow diagram illustrating biometric evaluation 108 according to an embodiment of the present invention. A biometric classification module 109a classifies user behavioral biometrics as unintentional 402 or intentional biometrics 403.

Unintentional biometrics pertain to biometrics which are inherently present in an individual's behavior. Thus, they can be considered as natural biometrics 106a. According to the illustrative embodiment of the present invention, unintentional/natural biometrics may consist of the following three classes of biometrics: natural speech 404; natural behavioral or gestural 405; and natural handwriting biometrics 417.

Natural speech biometrics 404 can appear during the course of natural speech processing, such as in a user's dialog during his or her interactions with a machine or other individual(s) 406, during his or her answers to questions 407, or via speech reading 408. During these user speech activities a user's natural speech characteristics such as, for example, accent, speaker manner, and stress can be measured to provide user identification/verification/clustering.

Natural behavioral or gestural biometrics 405 include, for example, a user's gait 409 and associated body movements 410. Furthermore, a user's handwriting manner provides a source of natural handwriting biometrics 417.

Intentional biometrics 403 pertain to biometrics that are intentionally produced by an individual in order for that individual to be authenticated by a security system. Similar to unintentional biometrics 402, three classes of intentional biometrics are described in the illustrative embodiment of the invention. They are as follows: speech 411 (e.g., an acoustic password that consists of a string of predefined intentionally produced sounds); gestures 412 (e.g., a gesture password that consists of a string of predefined intentionally produced movements); and handwritings 413 (e.g., a handwritten password that consists of a string of predefined intentionally produced handwritten symbols).

Another component of the biometric evaluation is the combining of the various sources described above. To accomplish this, first, a biometric identification module 109b indicates (i.e., identifies) the various biometric sources to be used to recognize an individual. Then, a single source evaluation module 415 evaluates each source of biometrics separately. For example, speech biometrics are evaluated by a speech recognizer, fingerprints are evaluated by fingerprint recognition devices, and user gestures are evaluated by gesture recognition means. For each biometric feature evaluated (i.e., each evidence), a score is attained representing a match between the individual feature evaluated and the corresponding feature of a given user (i.e., a verified user). These scores can be computed as a distance between measured biometrics produced by a verified user and stored prototypes of some person. After each single source is evaluated, then a combined source evaluation module 416 performs a final evaluation on the basis of all evidences reproduced by the different sources in order to recognize the user.

There is extensive literature describing how several features can be combined in order to perform a recognition function. For example, a recognition technique that combines different biometric features is described in U.S. Pat. No. 6,219,639, entitled "Method and Apparatus for Recognizing Identity of Individuals Employing Synchronized Biometrics", the disclosure of which is incorporated herein by reference. In this patent application, a general likelihood score corresponding to several sources of biometric information (combined model) is updated by individually excluding each information model and then adjusting parameters of the remaining model(s) to match an overall decoding result of the combined model. New combined models are constructed having components of the adjusted model(s). The procedure is iteratively continued until it stabilizes, thereby resulting in an improved match based on the combined attribute sources. Additionally, a method for combining several sources of information to recognize consistent information generated by a human subject is described in U.S. Pat. No. 5,502,774, entitled "Automatic Recognition of a Consistent Message Using Multiple Complimentary Sources of Information", the disclosure of which is incorporated herein by reference. According to the invention of the U.S. Pat. No. 5,502,774 patent, for each message unit (e.g., word), the total likelihood score is assumed to be the weighted sum of the likelihood scores resulting from the separate evaluation of each information source. Emphasis is placed on the estimation of weighing factors used in forming this total likelihood. This method can be applied, for example, to the decoding of a consistent message using both handwriting and speech recognition. Similar methods could be implemented to integrate different sources of information for improved user recognition/verification in the present invention.

Figure 5:
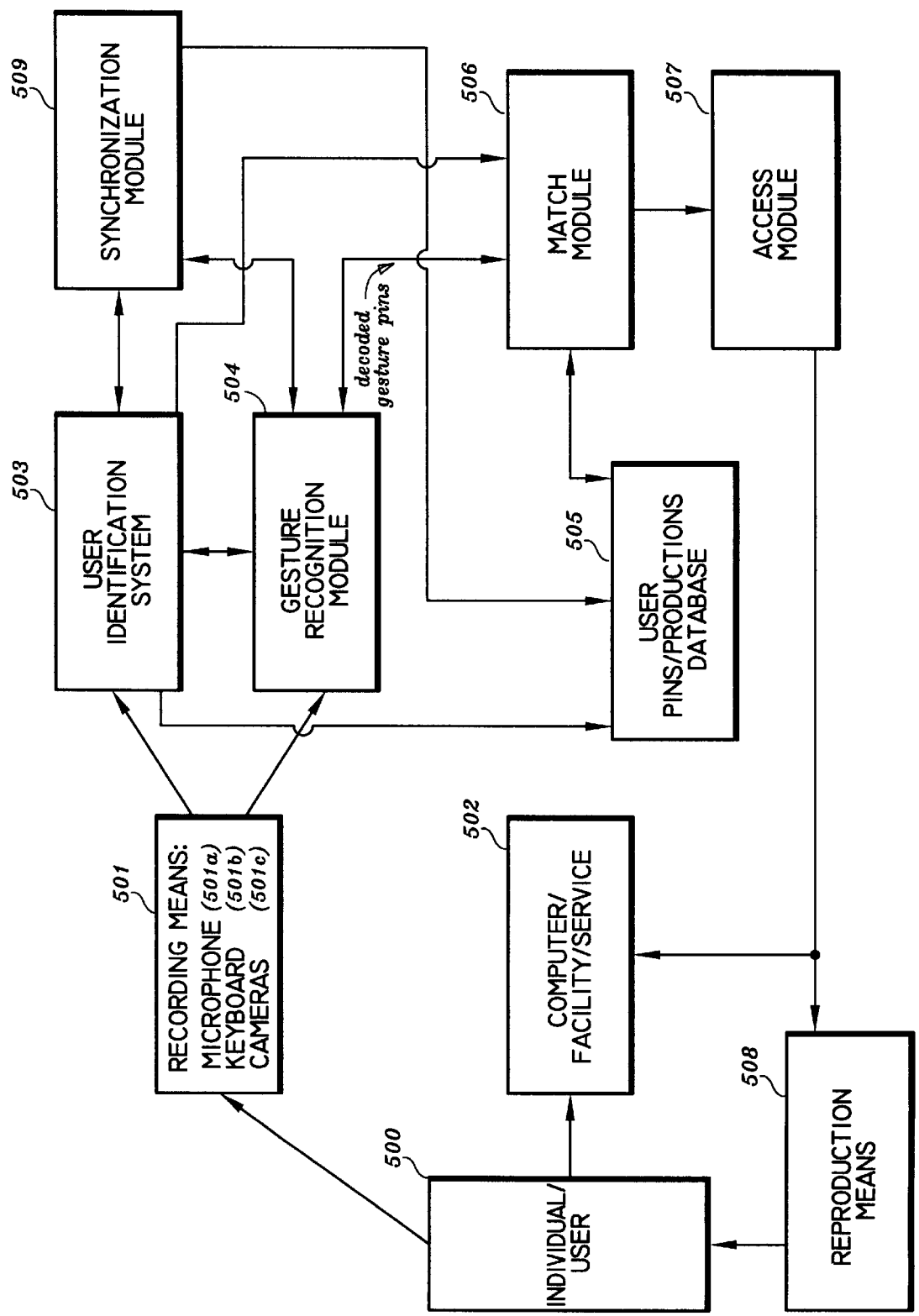
FIG. 5 is a block/flow diagram illustrating obtaining access to a computer/facility/service via the utilization of gesture pins according to an embodiment of the invention.

FIG. 5 is a block/flow diagram illustrating apparatus/procedure for obtaining access to a computer/facility/service via the utilization of gesture pins according to an embodiment of the present invention. An individual/user 500 attempting to obtain access to a computer/facility/service 502 produces a sequence of gestures. The individual may, for example, touch himself (e.g., his nose) or another object (a picture on a wall), or move a certain way (e.g., dance, wave his arms). Anywhere from one to several cameras 501c of recording means 501 film the gestures. Recording means 501 also contains devices such as a microphone 501a (to extract voice data) and a keyboard 501b (to obtain, e.g., a password). A gesture recognition module 504 maps the recorded gestures into a behavioral pattern (i.e., a decoded gesture pin). The decoded gesture pin is matched, via match module 506, to a behavioral pin (user pin) stored in a user pins/productions database 505 and a decision based on this match regarding whether or not to allow access/entry is executed by access module 507.

FIG. 5 also includes reproduction means 508 (e.g., a speaker or monitor) for furnishing requests/information to an individual (e.g., asking questions such as user identity, requesting a user's gesture pin, or informing the user whether access/entry has been denied/granted) based on the output of access module 507. A synchronization module 509 synchronizes user gestures with other user biometrics (e.g, facial movements are synchronized with voice phrases) provided via a user identification system 503. System 503 and synchronization module 509 are described in further detail with respect to FIG. 8.

Figure 6:
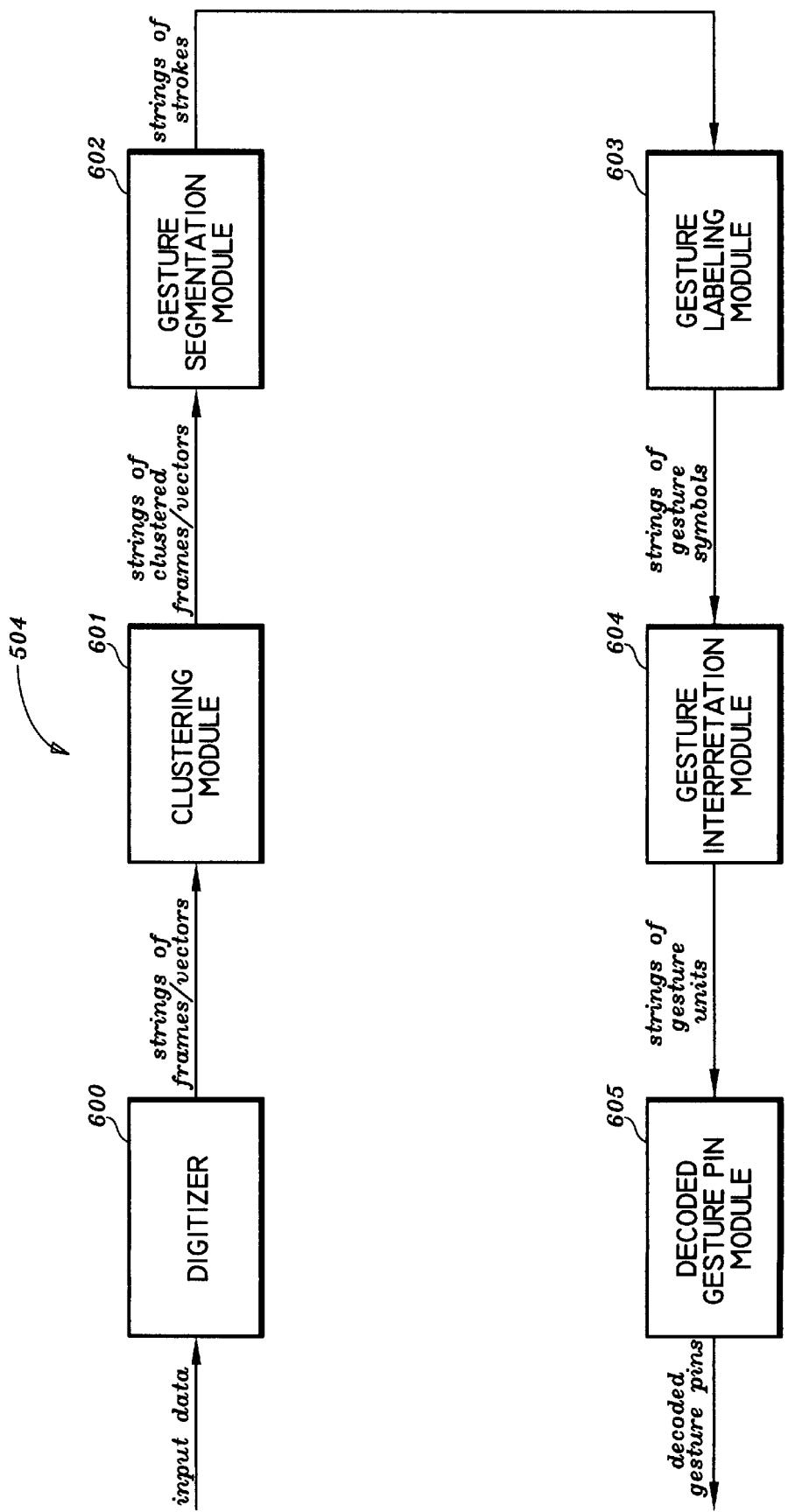
FIG. 6 is a block diagram of the gesture recognition module of FIG. 5 according to an embodiment of the invention.

FIG. 6 is a block diagram of the gesture recognition module 504 of FIG. 5 according to an embodiment of the present invention. Video input data (provided via recording means 501) is sampled at a predetermined rate via digitizer 600 and represented as a string of frames. Each frame is time stamped and can be represented as a multidimensional vector whose components reflect color intensities at different pixels. A clustering module 601 clusters these frames/vectors using general clustering methods (e.g., K-means). A gesture segmentation module 602 segments strings of clustered frames/vectors into strokes. A stroke is a series of images which represent the user performing a particular gesture (e.g., touch nose).

Figure 9:
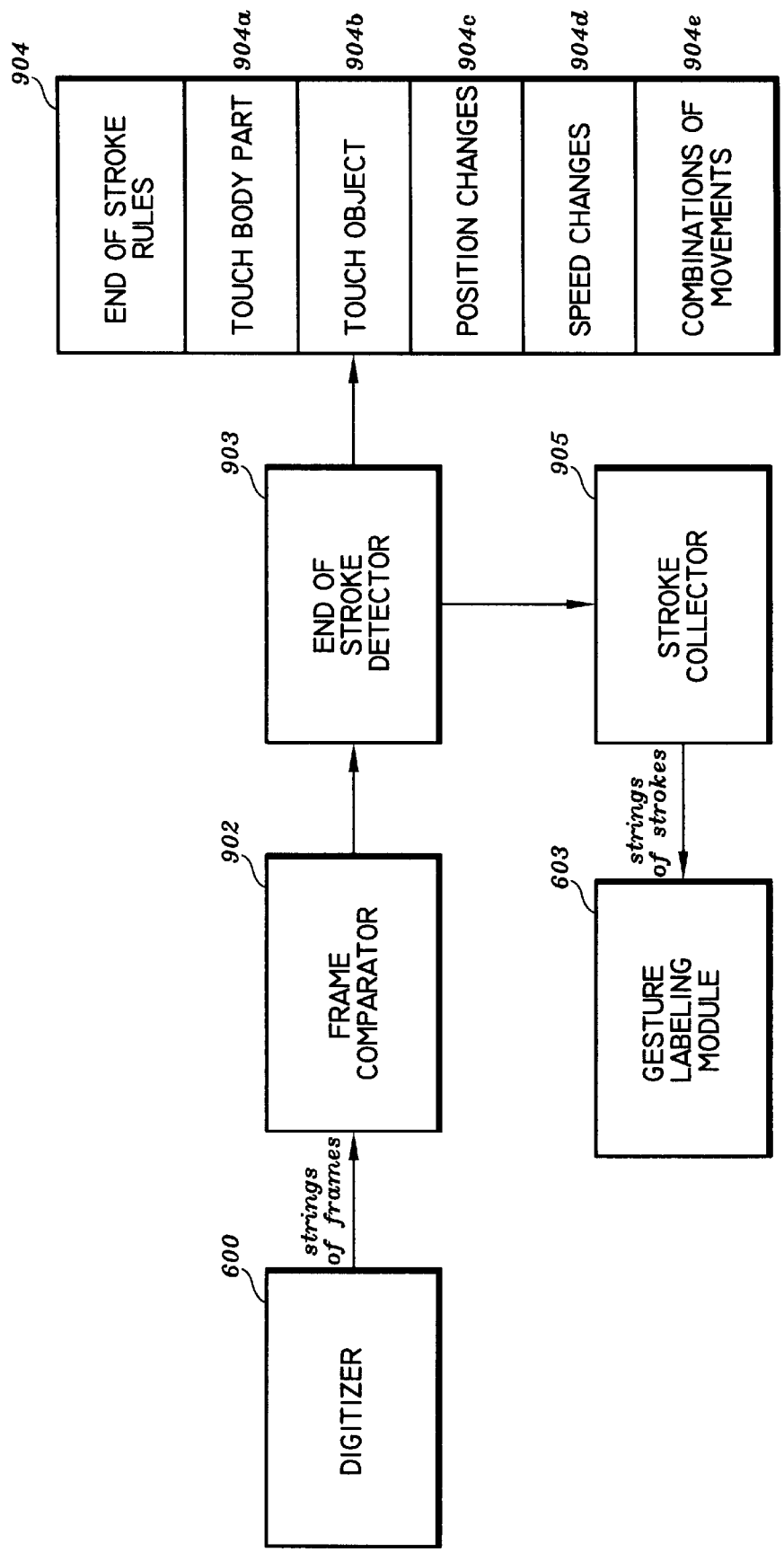
FIG. 9 is block/flow diagram for defining strokes according to an embodiment of the invention.

Strokes can be defined using predetermined rules. In the case where an individual moves his hand up and down, then touches his nose and finally, touches his forehead, the following strokes are possible: (1) 'move hand up'; (2) 'move hand down'; (3) 'touch nose' (one possible rule may be that a stroke is ended with any touch); and (4) 'touch forehead'. FIG. 9 hereinbelow explains in further detail how strokes are defined.

A gesture labeling module 603 classifies and labels strokes into gesture symbols. Thus, regarding the example provided above, strokes 1–4 could be classified and labeled as the following symbols: (1) "move_hand_up"; (2) "move_hand_down"; (3) "touch_nose"; and (4) "touch_ forehead". Gesture symbols may consist of several strokes. For example, the act of nodding a head consists of several strokes ('head up' and 'head down'), but could be classified with one gesture symbol ("nodding"). A more detailed description of gesture labeling is provided with respect to FIG. 10.

A gesture interpretation module 604 interprets strings of gestures symbols. An interpreted sequence of gesture symbols is referred to as a gesture unit. It is to be appreciated to that a sequence or string of gesture symbols may be interpreted as a semantic unit. For example, a string of gesture symbols "nodding, nodding, nodding" from the above example could be also interpreted as the gesture unit "NODDING". Alternatively, if strokes 'head up' and 'head down' are labeled as two different gesture symbols (i.e., "head_up" and "head_down"), then the gesture unit "NODDING" could be an interpretation of the string of gesture symbols "head_up, head_down, head_up, head_down, . . . ". The interpretation of a string of gesture symbols may be performed via either a lookup table of interpretations or a more sophisticated method. Sophisticated methods may be utilized when there are a large variety of possible interpretations and an efficient fast computational method is required. For example, the interpretation method can be HMM based. A more detailed description of gesture interpretation module 604 is provided with respect to FIG. 11.

It is to be appreciated that gesture symbols, unlike gesture units, do not encompass semantic information. The difference between gesture symbols and gesture units reflects the different levels of complexity present in the processing of information. On the first level (i.e., strokes to gesture symbols), there is too much statistical data to be processed to simply utilize rules to classify gesture symbols. Therefore, a statistical filter (e.g., Hidden Markov Models (HMMs)) is required. Accordingly, the states of the HMMs are labeled by base components (strokes), and the HMMs can be produced via simple concatenation of strokes. The second level corresponds to a higher level of processing. Since there is less statistical information available, rules may be utilized.

A decoded gesture pin module 605 generates a decoded gesture pin from a string of gesture units. It is necessary to distinguish gesture units that were produced specifically as a behavioral password (to obtain access) from "accidental" gesture units that were produced from unintentional movements. In order to do so, it is further necessary to detect the beginning and the end of a gesture pin. The beginning and the end of a gesture pin can be defined via different criteria. One such criteria is to use special gesture units to denote the beginning and the end of gesture pins. Other criteria and methods for generating gesture pins from gesture units are described in further detail with respect to FIG. 12.

Figure 7:
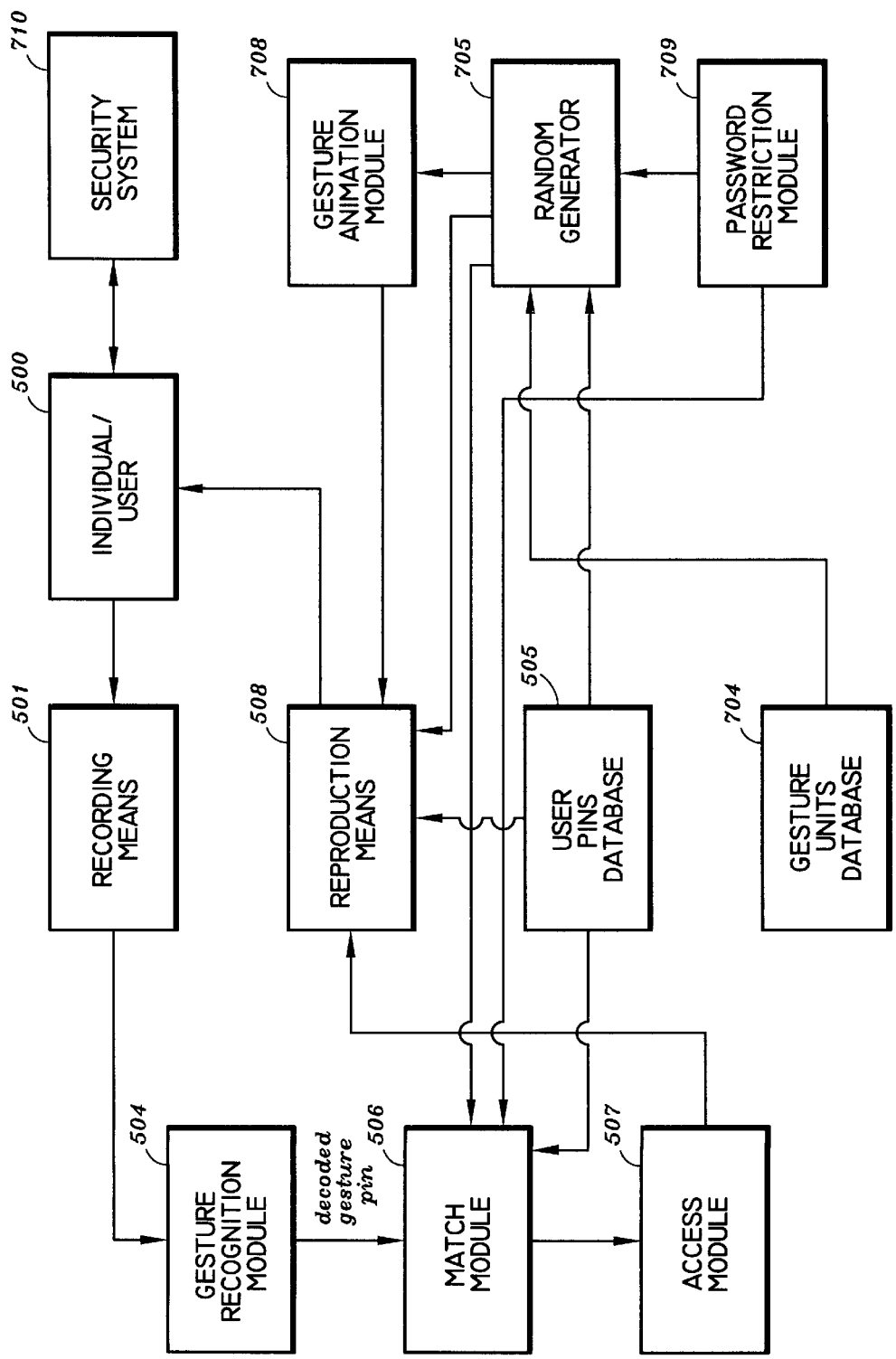
FIG. 7 is a block/flow diagram for providing users with gesture passwords according to an embodiment of the invention.

FIG. 7 is a block/flow diagram for providing users with gesture pins according to an embodiment of the present invention. As stated above, during an enrollment session, gesture pins may be either predefined and provided to a user or made up by the user himself. In the illustrative example, a new gesture pin is required either for a new user or if an old gesture pin assigned to a previous user has expired. If the user 500 wants to obtain a new gesture pin for future access to a secured service/facility, he or she must visit a special facility where new gestures pins are produced. A security system 710 checks whether or not the user 500 is permitted to obtain a new gesture pin. This security system 710 can include an administrator that checks the individual's ID (e.g., passport, driver's license) or a speaker verification system. If the user 500 is requesting a new gesture pin because his old pin has expired, the security system requests the old gesture pin and verifies it as in FIG. 5.

A gesture units database 704 stores a set of gesture units which are utilized by a random generator 705 to generate new gesture pins. A password restriction module 709 restricts the output of random generator 705 to predetermined password standards (e.g., trivial sequences of gestures are not outputted such as, for example, a gesture sequence corresponding to scratching one's head). Additionally, generator 705 is operatively connected to user pins/productions database 505 so that the generator output (i.e., a new gesture pin) does not repeat a user pin already stored in the database. This last connection (generator 705 to database 505) is optional since a gesture pin is utilized to verify an individual and not to necessarily identify the individual (although it may be so used). Thus, two or more individuals, having first been identified via indicia other than a gesture pin (e.g., morphological features), may be subsequently verified via the same gesture pin.

The user 500 obtains a new gesture pin from reproduction means 508. Reproduction means 508 may include visual (e.g., display or monitor) and oral (e.g., speaker) reproduction means. Thus, the new gesture pin can be obtained from reproduction means 508 visually as textual phrases or pictures, or as an animated set of necessary movements. Additionally, the new pin may be obtained orally as a description of necessary movements (e.g., "touch nose with hand"). The user then imitates the newly obtained gesture pin.

In the case where a new gesture pin is provided orally, the output of random generator 705 is provided directly to reproduction means 508 for reproduction. In the case where a new gesture pin is provided visually via reproduction means 508 as an animated set of necessary movements (cartoons), a gesture animation module 708 animates units in the new gesture pin (provided by random generator 705) according to its interpretation. For example, a gesture unit "touch_nose" can be reproduced as an animation (cartoon) of a hand that touches a nose. Animations corresponding to gesture units can be generated in real time or prepared in advance. Another way of visually providing a new gesture pin to a user via reproduction means 508 is by utilizing pre-recorded gestures performed by other users. In such a case, user pins/productions database 505 is directly connected to reproduction means 508. For example, as shown in FIG. 5, gestures produced by a user 500 are recorded by recording means 501. These gestures (or a portion thereof) can be stored for later display to another user who is requested to reproduce some of the pre-stored gestures. As a more specific example, consider that user A has produced a gesture corresponding to touching his nose. This gesture (among others included in his gesture pin) is recorded and stored as a "TOUCH NOSE" unit. When it is necessary to provide another user (e.g., user B) with a gesture pin which includes the gesture unit "TOUCH NOSE", a film of user A which includes a segment corresponding to the gesture unit "TOUCH NOSE" can be replayed for user B.

Returning to the description of how a user is provided with a gesture pin, recording means 501 records the imitated (and predefined) gesture pin, which is then forwarded to gesture recognition module 504. Module 504 maps the recorded gestures into behavioral patterns (i.e., decoded gesture pins). The gesture recognition module 504, which is operatively coupled to match module 506, provides the decoded gesture pin to module 506. Module 506 compares the decoded gesture pin supplied by gesture recognition module 504 to the displayed pin supplied by random generator 705 (and/or user pins/productions database 505 in the case a segment or all of another user's gesture pin is used) to determine whether or not the imitated pin matches the displayed pin. The result of the match is provided to access module 507, which is operatively coupled between match module 506 and reproduction means 508. If the imitated pin matches the displayed pin, the user is so informed via reproduction means 508. If the imitated pin does not match the displayed pin, access module 507 requests, via reproduction means 508, that the new pin be re-displayed and that the user 500 re-imitate the pin for recording by recording means 501. Additionally, upon a positive match, match module 506 forwards the new pin to user pins/productions database 505 for later reference.

In the case where the user selects his own gesture pin, the user first performs the pin. The pin may need to be performed several times to ensure that the selected pin is valid. Each performance is recorded by recording means 501 and processed by gesture recognition module 504 until the pin is found to be valid and which time it is then stored. The pin may be found valid by a confirmation action by the user. This may result from the pin being displayed by reproduction means 508 at which time the user reviews the pin to ensure the pin only contains the desired sequence of gestures. Additionally, for the pin to be valid, it must satisfy other requirements as described below.

It is to be appreciated that while the match module 506 appearing in FIGS. 5 and 7 are similarly identified, the module shown in FIG. 7 has the additional connection to random generator 705. Nonetheless, they have been similarly identified because, depending on the proximity of the special facility for obtaining new pins to the computer/service/facility sought to be accessed 502, the same module may be used. Alternatively, the match module of FIG. 7 may be used as the match module of FIG. 5, without the added connection and associated function.

As stated above, match module is connected to gesture recognition module 504 and random generator 705 (and/or user pins/productions database 505) in order to verify if a displayed pin matches an imitated pin. The password restriction module 709 is also connected to match module 506 so that in the case where a user 500 is allowed to select his own gesture pin (i.e., behavioral password), password restriction module 709 can ensure that the user selected gesture pin confirms to the predetermined standards (e.g., no trivial gestures are allowed such as scratching one's head). Additionally, user pins/productions database 505 is also connected to match module 506 so that a new pin suggested by the user 500 can be compared to existing pins so that the new user suggested pin does not duplicate a pin corresponding to another user. However, this last connection (database 505 to match module 506) is optional for the same reason stated above with respect to predefined gesture pins. That is, since pins are not necessarily used to identify and individual (but rather to verify the individual once the individual is identified), two (or more) users may have the same gesture pin.

Figure 8:
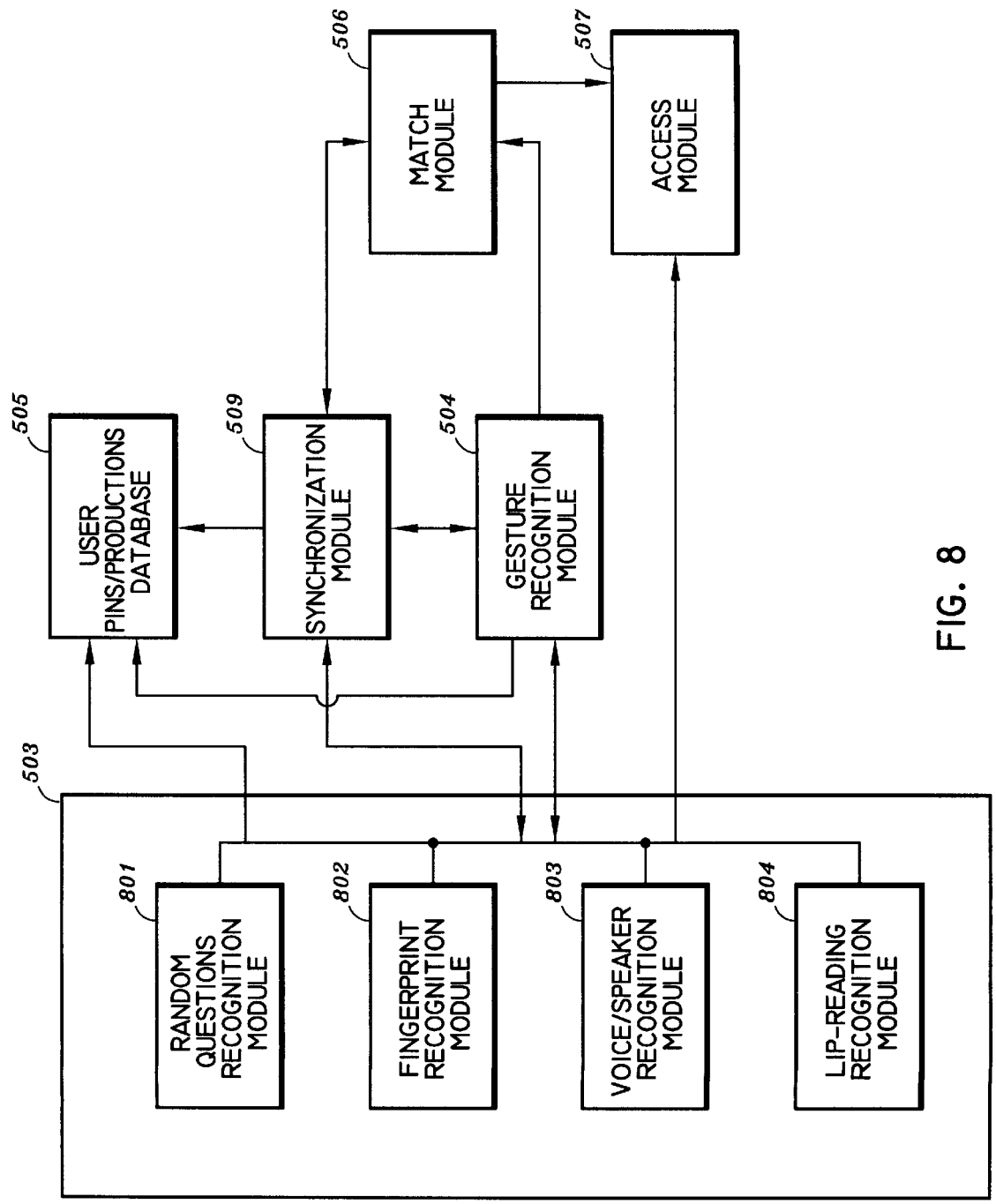
FIG. 8 is a block diagram of the user identification system of FIG. 5 according to an embodiment of the invention.

FIG. 8 is a block diagram further illustrating the user identification system 503 of FIG. 5 according to an embodiment of the present invention. System 503 can include modules corresponding to any number of features that may be associated with an individual, such as, for example, voice print, face recognition, signature recognition, face temperature infrared pattern, lip reading, writing instrument velocity, writing instrument pressure, fingerprint, retinal print, body geometry (e.g., height), body part geometry (e.g., hand geometry), a password, a personal identification number (PIN), and personal information. In the illustrative example, system 503 includes a random questions recognition module 801, a fingerprint recognition module 802, a voice/speaker recognition module 803, and a lip-reading recognition module 804.

Features (e.g., voice print) corresponding to the user recognition modules can be related to gestures in several ways. One such way is synchronization, as described in U.S. Pat. No. 6,219,639, entitled "Method and Apparatus for Recognizing Identity of Individuals Employing Synchronized Biometrics", the disclosure of which is incorporated herein by reference. The synchronization of multiple features as described in U.S. Pat. No. 6,219,639 allows multiple features contemporaneously extracted during a recognition session to not only be compared to pre-stored corresponding features to ensure a match therebetween, but also allows for a comparison of the association between the multiple features (e.g., in a speaker and lip shape recognition system, verifying that the behavior of a speaker's lips during the speaking of an utterance corresponds to the actual utterance provided to the speaker recognition system). Synchronization of the features (biometric or otherwise) associated with a contemporaneous feature extraction session is one aspect of the invention of U.S. Pat. No. 6,219,639 which marks a difference with conventional combined recognition technique systems which merely combine the scores of the individual mutually exclusive techniques but do not attempt to check the synchronization of the features extracted by each technique.

The term "synchronize" as applied to multiple features means to segment (sample) the multiple features according to a sequence of segmentation units and then index (label) the segmented features so that the segmented features corresponding to an identical segmentation unit in the sequence of segmentation units are associated to an identical index. For example, consider that an individual speaks the word "open" during a time interval from $t_0$ to $t_n$ of a recognition session. The utterance and his corresponding lip shape are sampled (segmented) at a rate of, for example, 100 ms and are labeled (indexed) by time frame (e.g., $t_0, t_1, t_2, \ldots$). The segmented and indexed portions of the utterance and lip shape corresponding to time frame $t_1$ are associated to each other in that they occurred during the same time frame ($t_1$). Thus, for example, if time frame $t_1$ corresponds to the voice sound "o", then the lip shape associated with time frame $t_1$ must correspond to an open mouth shape. For illustrative purposes, assuming that every two time frames correspond to the speaking of one letter of the word. the speaking of the voice sound "e" (at time frame $t_6$) should also correspond to an open mouth (but not as wide as when the voice sound "o" is produced). Accordingly, the features extracted at time frame $t_1$ (and so on) of an enrollment session are compared to the respective features extracted at time frame $t_1$ of a recognition session. As a result, not only are the voice sounds and lip shapes individually compared to corresponding previously stored data of the speaker, but the synchronization of the two attributes is also compared so that it can be confirmed that indeed the utterance provided to the speaker recognition system matches the behavior of the lips of the speaker. Thus, individuals actually speaking the words provided to the speaker recognition system may be discerned from individuals merely utilizing voice recordings, as well as individuals able to proficiently synchronize their lip movements with a pre-recorded voice (i.e., lip syncing). The aforementioned example thus implements a dynamic combination of speaker recognition techniques, lip reading techniques and lip recognition techniques.

An apparatus for recognizing an individual based on attributes associated with the individual according to embodiment of the invention of U.S. Pat. No. 6,219,639 includes a store for pre-storing two or more distinctive attributes of the individual during an enrollment session. A contemporaneous extraction means contemporaneously extracts the two or more distinctive attributes from the individual during a common recognition session. A segmentation means segments the pre-stored attributes and the extracted attributes according to a sequence of segmentation units. An indexing means indexes the segmented pre-stored and extracted attributes so that the segmented pre-stored and extracted attributes corresponding to an identical segmentation unit in the sequence of segmentation units are associated to an identical index. Finally, a comparing means respectively compares the segmented pre-stored and extracted attributes associated to the identical index to each other to recognize the individual.

As stated above, gestures may be synchronized with other features (e.g., acoustic characteristics and lip shape). Thus, in continuation of the previous example above, consider that a sequence of gestures are performed while the user is uttering the word "open" such that the user steps forward while speaking the first syllable of the word "open" and steps back while speaking the second syllable. Accordingly, at time frame $t_1$ for both the enrollment and the recognition data, the user must have spoken the voice sound "o", have an open mouth, and have taken a step forward. Similarly, at time frame $t_6$, for both the enrollment and the recognition data, the user must have spoken the voice sound "e", have an open mouth (albeit not as wide), and have taken a step back. The enrollment and recognition data are respectively compared to each other (per time frame, that is, $t_{1\_enrollment}$ versus $t_{1\_recognition}$, $t_{2\_enrollment}$ versus $t_{2\_recognition}$, and so on) to recognize the individual.

As described in U.S. Pat. No. 6,219,639, features may be synchronized (sampled and indexed) by a synchronizer so that the synchronized attributes may be respectively compared. However, it is to be appreciated that for certain features, the acts of segmenting and indexing may be performed by their corresponding recognition system. For example, a speech recognizer may, among other things, act as a synchronizer with respect to voice sounds. That is, it will segment utterances and index phonemes to time intervals. However, in other cases, a module for segmenting and indexing may be separately required. In either case, recognition of an individual according to the synchronization technique requires synchronizing both the pre-stored and the later extracted features of the individual and respectively comparing the synchronized pre-stored and later extracted features. Thus, in the first case, where one of the recognition systems incorporates the acts of segmenting and indexing, the remaining recognition systems must be operatively coupled to the recognition system performing the segmenting and indexing so that the features corresponding to the remaining recognition systems can be similarly segmented and indexed (i.e., sampling the features at the same rate (or a multiple thereof) so that the segmented portions of the features may be labeled (indexed) to correspond to the same moment in time in which they occur). In the present invention gestures are segmented and indexed by gesture recognition module 504 (specifically, digitizer 600). Thus, if gestures are to be synchronized to other biometric features, gesture recognition module 504 should be connected to synchronization module 509 to facilitate proper synchronization (i.e., in order to similarly segment and index). Further, in the case where synchronization occurs in the respective recognition systems of the user identification system 503 (and not synchronization module 509 (i.e., in the case of a speech recognition system)), then gesture recognition module 504 should be connected to system 503 to facilitate proper synchronization.

Another way of relating gestures to the features (e.g., voice print) corresponding to the user recognition modules is by simply comparing the gestures and the features individually and sequentially. That is, the gestures and features are not compared utilizing the synchronization technique of U.S. Pat. No. 6,219,639, but rather via the conventional method of simply combining the scores of the individual mutually exclusive techniques.

It is to be appreciated that the comparisons of the pre-stored features (corresponding to the enrollment session) to the later extracted features (corresponding to the recognition session) are performed by the respective recognition systems with the exception of gestures which have the comparison performed by match module 506. This is true in the case where gestures and features are synchronized and in the case when they are not synchronized. Accordingly, user identification system 503 is connected to access module 507 and, as stated above, match module 506 is also connected to access module 507, so that module 507 can process the results of all the comparisons. An individual is considered recognized if the results of all the recognition techniques are positive. Access module 507 processes the results of all the comparisons in case where the features and gesture are synchronized and also in the case where the features and gestures are not synchronized but simply compared individually and sequentially.

It is to be appreciated that the possible productions corresponding to a behavioral pin can be stored in various ways. The productions may include, for example, other features such as voice print, and/or characteristics associated with the performance of the gesture pin such as the speed associated with the performance of individual gestures making up a gesture pin. One such way of storing the productions is via links associated with a corresponding gesture pin. Links are simply addresses of locations in a memory device where corresponding productions can be found. Thus, in the case where a user performs a gesture pin, the links associated with the gesture pin are used to find corresponding pre-stored productions (that are to be matched to productions produced during a recognition session). This configuration presumes that a gesture pin and its corresponding productions are located in different locations (e.g., different storage devices). In another embodiment, composite behavioral pins may be used which include gesture pins and their corresponding productions (that is, the gesture pin and corresponding productions are stored in the same storage location, such as, for example, user pins/productions database 505). In such a case, user identification system 503 and synchronization module 509 are connected to user pins/productions database so that the various productions may be stored with the gesture pin as a composite behavioral pin. For example, a user can answer questions and produce some movements corresponding to his answers. Thus, when describing how large a fish was that he caught some time ago, the user responds with a verbal answer and also places his hands a certain distance from each other. Both the verbal answer and the gesture pin may be compared against a composite behavioral pin (or stored as a composite behavioral pin in the case where the user is permitted to make up his own behavioral password).

FIG. 9 is block/flow diagram for defining strokes according to an embodiment of the present invention. The digitizer 600 converts an analog video signal from the video camera into a digital signal. The conversion (digitization) involves spatial sampling and quantization. The video signal is made up of image frames. An image can be considered as an energy field with spatial extent, where each frame is a function of two spatial variables x and y and one temporal variable t. Spatial sampling is concerned with the energy sensed at various spatial locations of the object to be imaged. Quantization is concerned with assigning a number to the amount of energy sensed at each spatial location. Each spatial location to which a number is assigned is known as a pixel. As is known, the sampling must satisfy the Nyquist sampling rate to avoid aliasing errors.

Quantization results in a reduction in data variability, and correspondingly, a reduction in computational complexity. This is because quantization is a many-to-one mapping. That is, in quantization the input energy to the video camera is represented by a finite number of energy values and, if the energy at a particular pixel location does not take on one of the finite energy values, it is assigned to the closest value. For example, assume a priori that only energy values of 5, 10, 15 and 20 will be represented (units are of no importance in the example). If one particular pixel has associated therewith an energy value of 18, it will be assigned the energy value of 20 (the closest one).

Each digitized image is time stamped and can be represented as a multidimensional vector. Clustering module 601 clusters these vectors using general clustering methods. Similar to quantization, the process of clustering reduces data variability and computational complexity because it also is a many-to-one mapping. Clustering replaces several points (vectors) in an n-dimensional space that are proximate to one another with one point. That is, several close vectors are replaced by a representative vector (via, e.g., averaging). For example, 4 points located at the vertexes of a small square can be replaced by a single point located at the middle or center point of the square. The resultant point is hereinafter referred to as the cluster point or cluster vector.

Figure 13A:
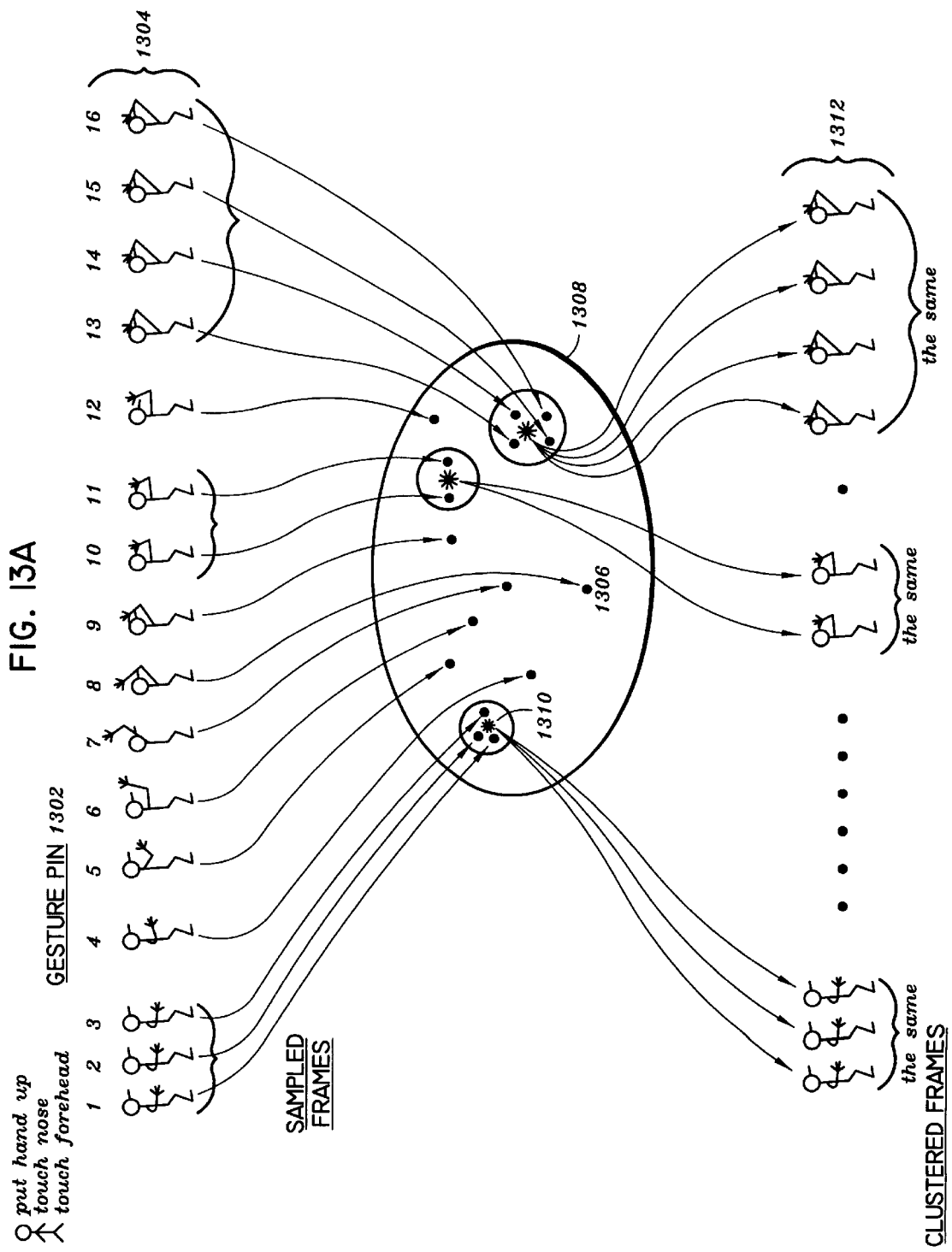
FIGS. 13A–B illustrate the processing of an example gesture pin by the gesture recognition module.

The following embodiment is provided to further explain the clustering procedure. A user is performing a gesture pin 1302 consisting of the following three gestures, as shown in FIG. 13A: (1) put hand up; (2) touch nose; and (3) touch forehead. Assume for illustrative purposes that digitizer 600 samples the corresponding input video signal at a rate of 2 samples per second. Thus, for each second, 2 image frames of user movements are obtained. This generates 2 consecutive image frames per second designated as $Wt=\{Vt_1, Vt_2\}$. Sampling is performed for 8 seconds. This generates 8 strings of frames designated as W1, W2, ..., Wt, ... W8, where each string of frames (e.g., Wt) consists of 2 consecutive frames for a total of sixteen consecutive frames. FIG. 13A illustrates the sampled sequence of sixteen frames 1304. The user's actions can be described as follows: first, the user is standing without doing anything more; then, he starts to put his hand up; moves his hand to his nose; keeps his finger on his nose; moves his hand to his forehead; and then maintains the latter position for some time.

Each of these image frames (i.e., a set of pixels having colors of different intensities associated therewith) can be represented as a single vector or point in an n-dimensional vector space, where n is defined as the product of the number of pixels in an image, the number of different colors represented, and the number of different intensities with which the colors can be represented. FIG. 13A illustrates the strings of images as points 1306 in an n-dimensional space 1308, some of which are grouped together or clustered. Several points may correspond to a relatively fixed position (e.g., a finger placed on a nose). These points will be located proximate to one another in the n-dimensional space and thus, may be clustered together and replaced by a representative point (i.e., a cluster point or cluster vector located at the center point of that particular cluster). Accordingly, in a subsequent processing step, the sequence of frames forming a cluster are represented by the same number of frames, but each frame is the same (i.e., is represented by the cluster point). Other points corresponding to user motion (e.g., generated while a user's hand was moving) may represent points in the n-dimensional space that are far apart from one another and thus, may not be clustered together and replaced by a representative point. Cluster points are denoted in FIG. 13A by stars 1310. Time labeling of each vector is preserved in order to later calculate characteristics associated with gesture performance such as, for example, speed.

FIG. 13A illustrates a sequence of clustered image frames 1312 that correspond to the cluster points. It is to be appreciated that, before clustering, several sampled frames of a user standing (i.e., frames 1–3 of 1304) varied slightly from one another despite corresponding to the same position. After clustering, the three similar frames are represented by a corresponding number of identical frames (cluster points) of the user standing. That is, the three slightly different frames of the user standing have been replaced by three identical frames of the user standing. Similarly, several different frames of a user touching his nose are now represented by a corresponding number of identical frames (cluster points) of the user touching his nose. Thus, this embodiment allows a similar sequence of vectors to be replaced with an identical sequence of vectors. Accordingly, clustering module 601 reduces the number of different vectors (images) required to be processed to recognize an individual.

In another embodiment illustrating clustering according to the invention, consecutive vectors representing the same or similar image (e.g., touch nose) are clustered. Similar images occurring non-sequentially are never within the same cluster. These clustered vectors are then represented by one vector (cluster vector) as described above. However, in contrast to the above described embodiment, the remaining frames of the clusters are dropped so that only the cluster point of each cluster remains. Additionally, the frames that were not clustered (and thus not represented by a cluster vector) remain (are not dropped). Thus, in sum, frames that are consecutive and repetitive are dropped (but their representative cluster point, as well as unclustered frames, remain). Thus, whereas the above embodiment replaced similar vectors corresponding to a single gesture with the same number of identical vectors, the latter embodiment reduces the number of vectors per single gesture to one vector. Thus, with respect to the clustered frames 1312 depicted in FIG. 13A, two identical frames should never follow one another.

Time labeling of frames is preserved so that characteristics associated with the performance of gestures (e.g., the speed of performing a gesture or sequence of gestures) may be later extracted. Accordingly, in the case of a cluster vector generated via the latter clustering technique, the time variable associated with that cluster vector is updated to reflect the duration of all integrated vectors (i.e., the time variable of the cluster vector represents the time variable of all the vectors within the associated cluster).

After clustering, the clustered vectors/frames are then input to gesture segmentation module 602 which consists of a frame comparator 902 operatively coupled to an end of stroke detector 903 which, in turn, is operatively coupled to a stroke collector 905. Detector 903 detects ends of strokes using a set of rules hereinafter referred to as end of stroke rules 904.

The frame comparator 902 performs two functions. First, consecutive frames are compared among themselves to measure the speed of positional changes of a user's body (i.e., the transition speed from one position/gesture to another position/gesture). Second, frames are compared with a library of basic positions required to interpret user gestures. These positions include, for example, pictures of a finger touching an object (e.g., nose, forehead, ear, wall, table) or pictures of essential elements of body part movements (e.g., a straight versus a folded hand, a closed versus an opened eye). The results of the above comparisons are utilized by end of stroke detector 903 to detect the end of strokes. A stroke is a series of images which represent the user performing a particular gesture. Thus, if a series of 10 images correspond to the user first lifting his hand over his head (first 5 frames) and then lowering his hand to his side (last 5 frames), end of stroke detector 903 detects the end or last image which forms part of a particular gesture.

As stated above, characteristics corresponding to the performance of both intentionally and unintentionally performed gestures may be incorporated into a behavioral password (e.g., the speed associated with the performance of individual gestures making up a gesture pin, the speed of transitioning from one gesture to another). These characteristics are computed by frame comparator 902 and may be stored via the use of links associated with a gesture pin or as a composite behavioral pin, as described with respect to FIG. 8.

The rules 904 utilized by end of stroke detector 903 may include many criteria for detecting the end of a stroke. For example, the end of a stroke may be detected by associating a stroke end with the following: the user touching something with his hand or finger (e.g., a part of his body (904a) or an object (904b); position changes of a particular body part or the whole body 904c (e.g., open to closed such as closing an eye, making a fist; down to up such as raising a hand which is initially lowered; and up to down such as squatting or sitting down); and speed changes in the movement of a particular body part or the whole body 904d (e.g., a hand is waved from left to right). While position changes 904c and speed changes rule 904d are similar in that both may be implicated with a user motion, a predetermined threshold value may be utilized for both to constrain the detection of stroke ends. Thus, for example, a speed change will not be detected (and correspondingly a stroke end will not be detected) if the speed change is not above (or, if desired, below) a predefined threshold. Alternatively, a speed change may be detected only if the speed change is a change of direction (e.g., moving a hand up and then moving the hand down, the change corresponding to instant where the hand first goes down) and not a change in magnitude (e.g., faster or slower). Additionally, combinations of predefined movements 904e may be used to detect stroke ends (e.g., wave right hand rapidly and touch left hand to forehead at same time).

Figure 13B:
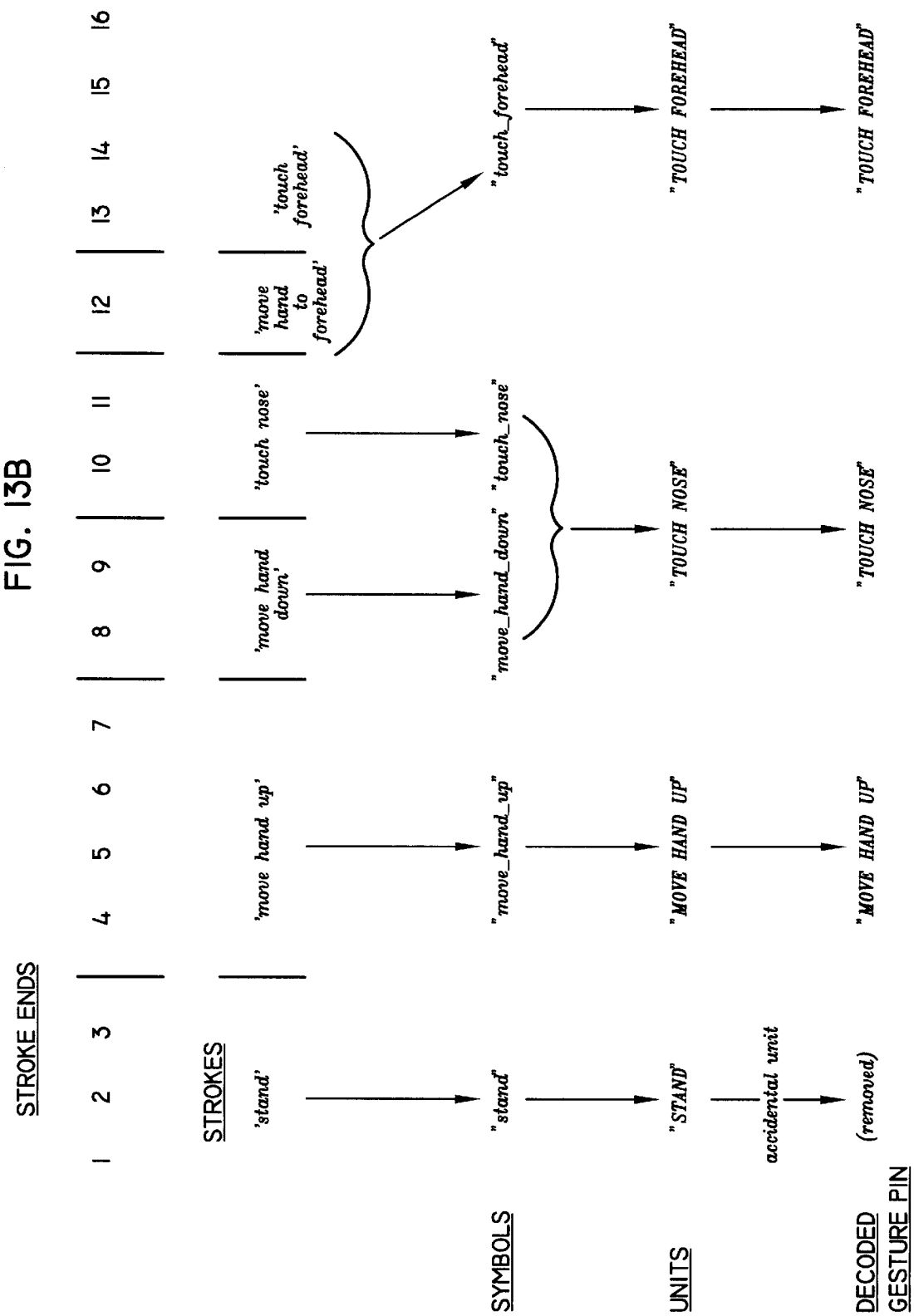

In order to provide a clear understanding of the stroke detection procedure as described above, the procedure will be further described in FIG. 13B by further continuing the example of FIG. 13A. Referring to FIG. 13B, the sampled image frames 1304 of FIG. 13A are respectively denoted by numbers 1314. A slash (\) is used to illustrate the end of individual strokes, which are defined as described below. In accordance with rule 904c (position changes), a first stroke in FIG. 13B is ended at a particular frame (i.e., frame 3) which is before the frame corresponding to the user starting to raise his hand (i.e., frame 4). The position change is from the user simply standing with his hands at his sides (frames 1–3) to the user raising a hand up (starting at frame 4). In accordance with rule 904d (speed changes), a second stroke in FIG. 13B is ended at frame 7 which is before the frame corresponding to the user lowering his hand (i.e., frame 8). This corresponds to a change in the direction of the speed with which the user's hand is moving (that is, from the user raising his hand up (frames 4–7) to the user lowering his hand down (starting at frame 8). In accordance with rule 904a (touching a body part), a third stroke is ended at frame 9 which is before the frame corresponding to the user touching his nose (i.e., frame 10). A fourth stroke is ended at frame 11 which is before the frame corresponding to the user starting to move his hand to his forehead (rule 904c). A fifth stroke is ended at frame 12 which is before the frame corresponding to the user touching his forehead (rule 904a). Assume, the sixth stroke ends at frame 16. Based on the results of the comparison performed by frame comparator (902) and the detection of stroke ends by end of stroke detector 903, the six strokes are defined as follows (as shown in FIG. 13B): 'stand'; 'move hand up'; 'move hand down'; 'touch nose'; 'move hand to forehead'; and 'touch forehead'. Strokes (having been identified in accordance with detector 903) are collected (stored) in stroke collector 905.

Figure 10:
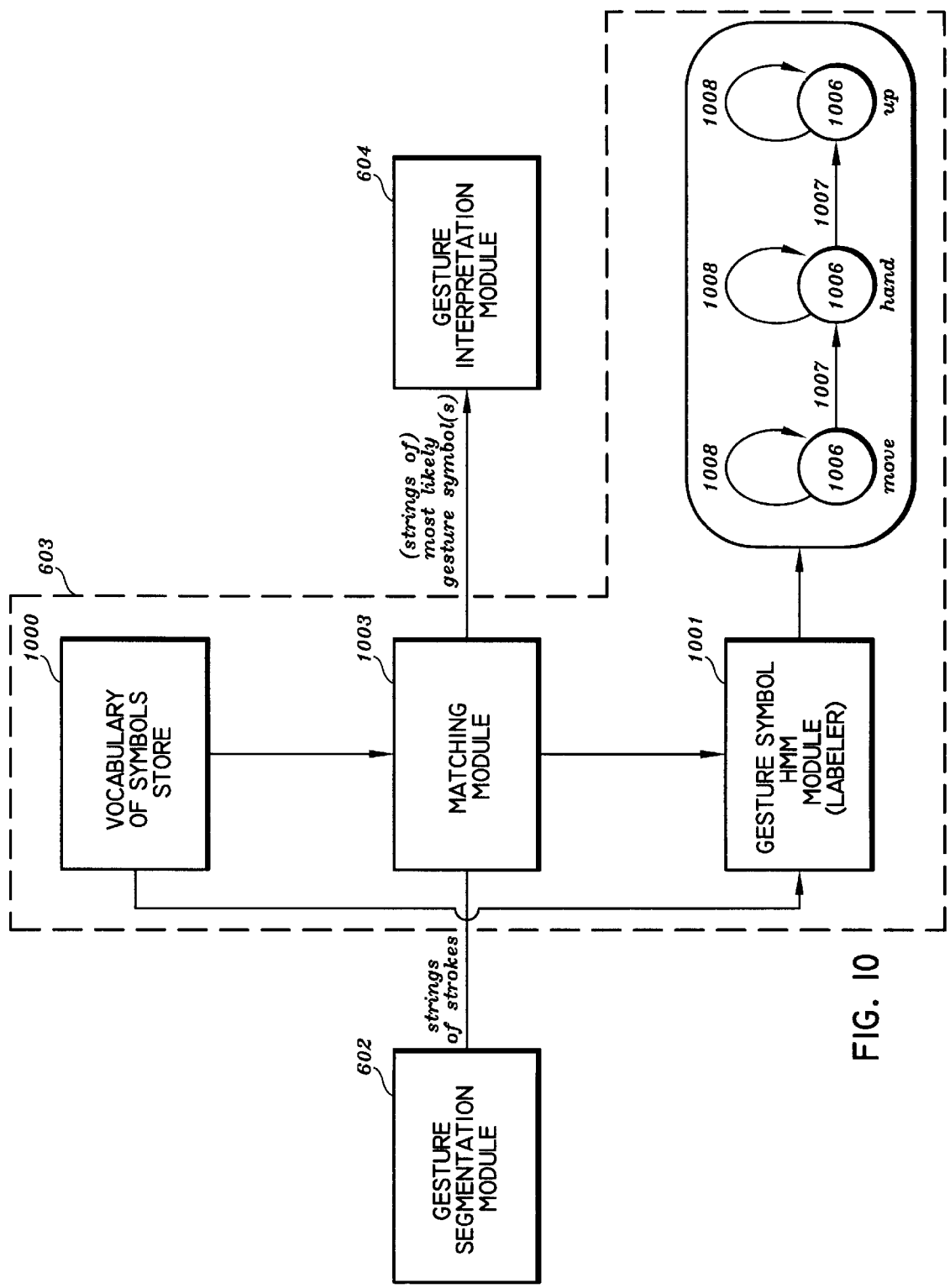
FIG. 10 is a block diagram of the gesture labeling module of FIG. 6 according to an embodiment of the invention.

FIG. 10 is a block diagram further illustrating the gesture labeling module 603 of FIG. 6 according to an embodiment of the present invention. The labeling module 603 includes a vocabulary of symbols store 1000, a matching module 1003, and a gesture symbol HMM module (labeler) 1001. The vocabulary of symbols store 1000 contains a set of different symbols that can be constructed from strokes. Symbols are obtained by concatenating strokes. Consider for example the following strokes resulting from the example of FIG. 13B: (1) 'stand'; (2) 'move hand up'; (3) 'move hand down'; (4) 'touch nose'; (5) 'move hand to forehead'; and (6) 'touch forehead'. Strokes 1–6 could be classified and labeled as the following symbols: (1) "stand" (2) "move_hand_up"; (3) "move_hand_down"; (4) "touch_nose"; (5) "touch_forehead". Gesture symbols can consist of several strokes, as illustrated by the combination of strokes 5 and 6 into one symbol (symbol 5). As another example, while nodding a head consists of several strokes ('head up' and 'head down'), it may be classified with one symbol ("nodding").

It is to be appreciated that not all strokes can be concatenated into a single gesture symbol. For example, moving the right hand up and the left hand down will not be concatenated into one symbol. Various criteria may be considered for concatenating strokes into one symbol. For example, continuity of passing from one stroke to another can be required (with a predetermined list of exceptions). One can use statistical criteria of what stroke and sequences of strokes are most probable for a given user population to avoid concatenating an unlikely combination of strokes into a symbol.

Each symbol in the vocabulary store 1000 corresponds to some Hidden Markov Model (HMM) for that symbol, which is generated by symbol HMM module (or labeler) 1001. The Hidden Markov Model 1005 for a symbol consists of a collection of three states 1006 connected to one another by transitions 1007 which produce labels corresponding to a set of strokes. The three states 1006 correspond to strokes. The labels (sets of strokes) correspond to the output arcs 1008 of the three states. The transition arcs 1007 exhibit uniform probabilities or may be trained. For example, the HMM 1005 for the symbol "move_hand_up" gives rise to the following 3 states MOVE, HAND, UP 1006. An output arc 1008 for the HAND state 1006 can have output labels corresponding to the following stroke names: finger, hand, elbow, and head. These output labels have some probability distribution which can be estimated using different methods. For example, a statistical database can be used reflecting how often people move their fingers, elbows, both their hands, or other parts of their body when they are asked to move one of their hands up. Uniform distributions for output labels can be provided and then, training of HMMs on a set of strokes that are labeled manually can be performed. For training, one state is chosen as an initial state and another state is chosen as a final state. A training algorithm assigns probabilities to all strings of transitions from the initial state to the final state, as well as all outputs generated in the process. The procedure is similar to generating HMMs for words in a speech recognition system where different HMMS correspond to different words and states of the words consist of phonemes (letters) in these words.

The matching module 1003 matches a string of strokes from gesture segmentation module 602 with each HMM 1005 in symbol HMM module 1001. The likelihood of producing a given set of strokes for each HMM in 1001 is obtained via standard means (e.g., Forward-Backward algorithm). A symbol with the highest likelihood is provided to label a given string of strokes. It is to be appreciated that other methods can be utilized for labeling strokes. For example, a simple lookup table of all symbols and their representations as strings of strokes can be utilized. In such a case, it can be easily determined what symbol matches a given string of strokes.

Figure 11:
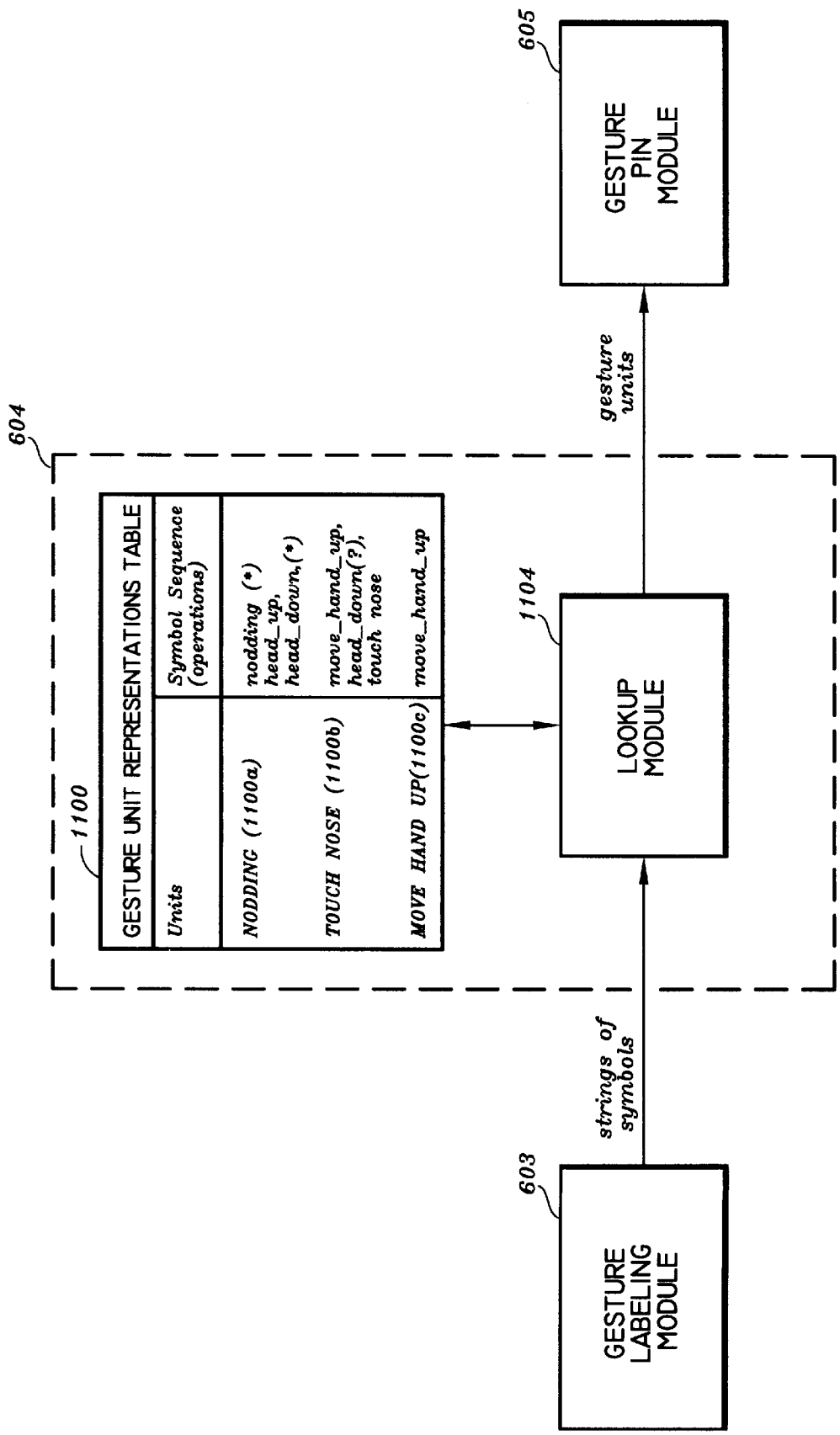
FIG. 11 is a block diagram of the gesture interpretation module of FIG. 6 according to an embodiment of the invention.

FIG. 11 is a block diagram further illustrating the gesture interpretation module 604 of FIG. 6 according to an embodiment of the present invention. As stated earlier, the gesture interpretation module 604 interprets strings of gesture symbols. An interpreted sequence of gesture symbols is referred to as a gesture unit. The interpretation of a sequence of gesture symbols may be performed via either a lookup table of interpretations or a more sophisticated method. Sophisticated methods may be utilized when there are a large variety of possible interpretations and an efficient fast computational method is required.

It is to be appreciated that a sequence or string of gesture symbols may be interpreted as a semantic unit. For example, a sequence of gesture symbols "nodding, nodding, nodding" from the above example could be also interpreted as the gesture unit "NODDING". Alternatively, if strokes 'head up' and 'head down' are labeled as two different gesture symbols (i.e., "head_up" and "head_down"), then the gesture unit "NODDING" could be an interpretation of the sequence of gesture symbols "head_up, head_down, head_up, head_down, . . . ". In continuance of the example of FIG. 13B, the sequence of five gesture symbols consisting of "stand", "move_hand_up", "move_hand_down", "touch_nose", and "touch_forehead" may be interpreted as the following four gesture units: (1) "STAND"; (2) "MOVE HAND UP"; (3) "TOUCH NOSE"; and (4) "TOUCH FOREHEAD". Note that the gesture symbols "move_hand_down" and "touch_nose" have been interpreted as the single gesture unit "TOUCH NOSE".

According to an embodiment of the present invention, gesture interpretation module 604 includes a gesture unit representations table 1100 and a lookup module 1104. The table 1100 contains a list of all possible gesture units (e.g., NODDING 1100a or TOUCH NOSE 1100b). Each unit contains one or several of its representations as symbol sequences. For example, NODDING could be represented as a sequence of symbols "nodding" or as a sequence of symbols "head_up" and "head_down" (depending on what vocabulary of symbols is available). Since symbols can be repeated many times, this possibility is expressed with a star character (*) at the right of a symbol definition in 1100. Thus, as an example, if a gesture pin performed by a user during a recognition session includes three individual nodding movements and the user pin only includes a single nodding movement, a match may still occur if a (*) operator follows the symbol "nodding" in gesture unit representations table 1100.

Other operations for clarifying the definition of symbol sequences are possible. For example, optional symbols may be identified via operators (specialized characters such as the (*) defined above). Thus, for a unit TOUCH NOSE, an operator (?) is used to mark the symbol "head_down" which means that the symbol ("head_down") is optional with respect to the interpretation (i.e., when a person touches his nose he may or may not put his head down, thus an interpretation corresponding to the unit TOUCH NOSE may or may not include this symbol).

The lookup module 1104 checks a string of symbols from gesture labeling module 603 against table 1100 to provide a gesture unit. The interpretation method can also be HMM based (as described with respect to FIG. 10).

Figure 12:
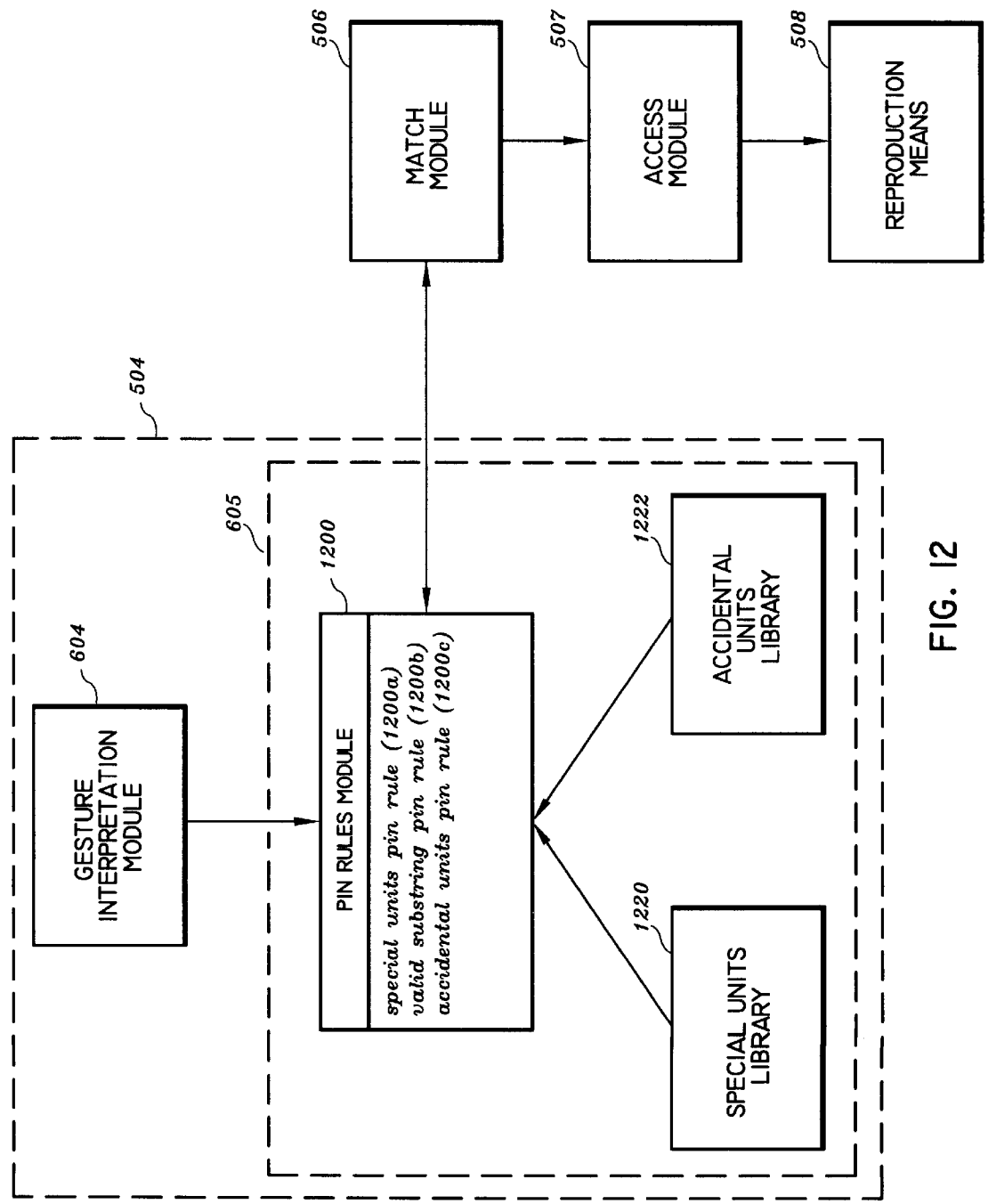
FIG. 12 is a block diagram of the decoded gesture pin module of FIG. 6 according to an embodiment of the invention.

FIG. 12 is a block diagram further illustrating the decoded gesture pin module 605 of FIG. 6 according to an embodiment of the present invention. Module 605 includes a pin rules module 1200 operatively coupled to a special units library 1220, and an accidental units library 1222. As stated above, a sequence of gesture units is formed into a gesture pin by gesture pin module 605.

It is necessary to distinguish between gesture units resulting from gestures that were produced specifically for a password (to obtain access) from "accidental" gesture units. This is because while "accidental" gesture units resulting from unintentional movements (gestures) may be incorporated into a behavioral password as an additional way to recognize an individual, they may also be "noise" movements which are not considered in the recognition process. A stated above, noise movements are gestures that a person may produce which are not part of a gesture pin nor associated with the gesture pin (i.e., not a result of reflex or habit). They occur sporadically and do not affect or invalidate the gesture recognition process. Thus, noise movements are distinguishable from movements which may be incorporated into a behavioral password because they are neither expected to occur (e.g., reflexive) nor detected with a sufficient frequency (e.g., habit). For example, perhaps a particular user habitually bends his head down every time he touches his nose. This unintentional act may be incorporated into his corresponding behavioral password so that every time he performs his gesture pin (which includes touching his nose), the unintentional gesture (of bending his head down) is also extracted, processed and compared to corresponding pre-stored data.

The pin rules module 1200 contains rules that facilitate the identification of a gesture pin from a string of gesture units. Any combination of these rules can be used as well as the introduction of other (statistical) criteria. One such pin rule, hereinafter referred to as a "special units" pin rule 1200a, requires the use of "special" gesture units to denote the beginning or the end of a pin. A "special" gesture unit is simply a gesture unit that is utilized to identify the beginning and the end of a gesture pin. The special gesture unit may be a gesture that is performed before and after the performing of the actual gestures which make up a gesture pin. For example, before and after a person produces a gesture pin (comprised of a dance step), he may be required to perform a "special" gesture such as touching a particular location on the door he is seeking access through. Each act of touching marks the beginning and the end of the gesture pin, respectively, that is performed therebetween. Alternatively, the special gesture unit may be the first and last gestures of a gesture pin and thus included in the actual gesture pin. It is to be appreciated that while the same special gesture unit may be used to identify the beginning and the end of a gesture pin, different special gesture units may also be used to respectively identify the beginning and the end of a gesture pin. The special units library 1220 stores "special" units.

Another possible rule, hereinafter referred to as a "valid substring pin" rule 1200b, requires that a sub-string of a decoded gesture pin match a valid user pin in order for it to be accepted (valid). Implementation of the valid substring pin rule requires access to user pins stored in user pin database 505 through match module 506. The "valid substring pin" rule 1200b is utilized to detect the onset of a gesture pin in a larger sequence of gestures. Since a user may perform a seamless string of gestures, perhaps attempting to mask a gesture pin within a larger sequence of gestures, the detection of an gesture pin onset is critical to identifying the individual. To illustrate this importance, consider the following examples. The standard practice used to send a password (e.g., "ZQXQW") into a computer system via a keyboard is to type in the password. In this case, detection of the onset of the password by the system is simple; the system considers the first character of the input as the onset of the password. In a second case, the user may type a note into the computer and enter the password corresponding to some location within the note (e.g., "Hello David ZQXQW. How are you?"). In such a situation, the detection of the onset of the password requires interaction with a password pin module while the user is in another mode (writing the note). These types of situations may similarly occur with the use of gesture pins. Accordingly, the onset of a gesture pin is detected via interaction with match module 506 while the gesture recognition process is still occurring in gesture recognition module 504. That is, after the onset of a gesture pin is detected via the interaction with match module 506, the gesture pin will continue to be processed by recognition module 504 in order to be fully recognized.

A third rule, hereinafter referred to as an "'accidental' units" rule 1200c, may be utilized with respect to associated moves that may accompany gesture pins (i.e., deliberate moves). For example, while a person is nodding his head, he may accidentally take a small step (thus, the small step is associated with nodding one's head). Accordingly, a library of "accidental" moves that are often associated with certain gesture pins can be classified as units and stored in accidental units library 1222. Thus, accidental units rule 1200c can be used to check for accidental units so that the accidental units can be either removed from the gesture sequence provided by the user (before comparison of the resulting decoded gesture pin by match module 505) or used to further verify that the intended gesture pin has been performed (as part of the comparison performed by match module 505). The "accidental" moves are removed in the case of "noise" movements and/or reflexive or habitual movements associated with the performance of a gesture pin which are not desired to be included in a behavioral password. The "accidental" moves are not removed when they are the product of reflex or habit and their inclusion is desired.

In the case that an "accidental" move(s) is deemed a "noise" move or is otherwise not desired to be included in a behavioral password, it is simply removed from a resulting decoded gesture pin before the pin is compared to a user pin by match module 506. For example, with respect to FIG. 13A, where the user is required to perform a gesture pin 1302 consisting of to three intentional gestures (put hand up, touch nose, and touch forehead), the recording means 501 also records the user simply standing before performing the intentional sequence of gestures. The act of standing is thus processed by the gesture recognition module (see FIGS. 13A–B). However, since the gesture of standing is not associated with the first required gesture (put hand up 1100c) in the gesture unit representations table 100, the resultant STAND unit is deemed an "accidental" move by pins rules module 1200 and is accordingly removed in the resultant decoded gesture pin (as shown in FIG. 13B).

In the case that an "accidental" move(s) is desired to be included in a behavioral password, such inclusion is optional. Thus, during the processing of a gesture pin by gesture recognition module 504, the "accidental" move is only used in a comparison with pre-stored data (corresponding to the "accidental" move) if the "accidental" move is performed. This is because if the "accidental" move is desired to be included in every performance of a behavioral password (and thus every recognition session involving the particular user), then it should be included in the intentional gesture pin (as an intentional gesture). An "accidental" move which is desired to be included in a behavioral password (and which, by definition, is a product of reflex or habit) is represented in gesture unit representations table 1100 of FIG. 11 with an optional operator (i.e., the operator (?)).

Thus, in FIG. 12, a string of gesture units from gesture interpretation module 604 are processed in gesture pin module 605 so that a decoded gesture pin is generated therefrom. The decoded (imitated) gesture pin is then compared to a user pin stored in user pins/productions database via match module 506. The result of the match is provided to access module 507. If the imitated pin matches the displayed pin, the user is so informed via reproduction means 508. If the imitated pin does not match the displayed pin, access module 507 requests, via reproduction means 508, that the new pin be re-displayed and that the user 500 re-imitate the pin for recording by recording means 501. Such a request may occur, for example, if a special unit corresponding to the beginning of a gesture pin was detected but no special unit was detected corresponding to the end of the gesture pin.

In an embodiment of the invention, particularly in the case of repetitive recognition of a particular user, a predefined threshold (n) number of occurrences may be utilized to determine whether an associated movement(s) should be included in a behavioral password (i.e., whether a particular movement is deemed an "accidental" move which is the result of reflex or habit and thus associated with a corresponding gesture in table 1100 and followed by a (?) operator). Accordingly, the associated movement may be included in the password if it occurs during the performance of every gesture pin for (n) number of consecutive performances or during (n) number of performances out of (o) number of performances (where o>n). This approach can be utilized to determine if a particular gesture is a result of reflex or habit. This approach may be applied more broadly to multiple or all users in order to build the accidental units library 1222.

It is to be appreciated that while the same individual will likely perform the same gesture pin numerous times in a relatively similar manner, different individuals may perform the same gesture pin slightly differently. For example, the speed between individual gestures in a gesture sequence may vary between different individuals as well as the smoothness of the motions. Thus, the incorporation of unintentional gestures and characteristics associated with the performance of both intentional and unintentional gestures (e.g., speed, smoothness) in a behavioral password facilitates an increase in the accuracy of the recognition.

It is to be appreciated that the invention facilitates the transfer of biometrics of a first user to at least one other user. That is, when a behavioral password corresponding to a first user consists of a simple intentional gesture sequence, that sequence may be taught by the first user to a second user to allow the second user access to a computer/facility/service. This would be beneficial in a case where, for example, access to the first user's home is based on recognition of an intentional gesture sequence (gesture pin) and the first user desires that the second user enter the home to feed a pet while the first user is away on business. The behavioral password in this example may also consist of a sound portion which may be temporarily disabled, similar to the valet feature in an automobile alarm. However, if the sound portion is based merely on the recognition of a conventional password (not to be confused with behavioral password), then the conventional password may also be disclosed to the second user and thus, is not required to be disabled. Then, the second user may utilize the to behavioral password (consisting of the intentional sequence of gestures and conventional password) disclosed to him by the first user to gain access to the first user's home to feed the pet. When the first user returns from his business trip, he may then change the behavioral password so that the second user can no longer gain access the first user's home.

It is to be further appreciated that the invention facilitates easy alteration of biometric features associated with a user. That is, when a behavioral password consists of a simple gesture sequence, that sequence may be easily altered and made more complex when additional security is desired. For example, characteristics associated with the performance of a gesture pin may be incorporated into the behavioral password to further associate the password to the particular user. Moreover, speech and speaker recognition may be incorporated into the behavioral password. The present invention provides a flexible concept of behavioral passwords which may be combined with additional indicia (i.e., the broader concept of total biometrics) to recognize an individual.

The present invention facilitates user recognition (classification/identification/verification) in a natural computing environment. A user may be identified by simply presenting himself before a computer (i.e., without making an identity claim). Once a user is identified, the identification can be used to retrieve a name and personal information such as the user's preferences. Moreover, the user's history of previous activity such as commands can be retrieved and used to automatically control the computer system. That is, previous commands in the form of gestures and speech may be retrieved for to ready comparison with newly issued commands. The control resulting from the commands could include establishing communication links (e.g., internet hookup) and establishing application commonly used by the particular user.

In a preferred embodiment of the invention, confidence levels are implemented in the identification process such that a minimum confidence level is required for a user to be identified. The concept of a minimum confidence level can also be implemented in an open set of users, such that a user is assumed to be unknown (and thus not identified) if the minimum confidence level is not met.

According to the invention, the user is verified (authorized) based on the implementation of a behavioral password. That is, the user may be requested to provide a behavioral password (via reproduction means 508) which is recorded (via recording means 501), decoded (via gesture recognition module 504, user identification system 503, and/or synchronization module 509), and compared against existing data to confirm that the user is indeed authorized to access and use the computer. Further, the concept of total biometrics (which includes behavioral passwords) may be implemented so that an individual can be verified based on numerous indicia, as stated above. It is to be appreciated that the implementation and combination of multiple evidences provides an additional measure of security with regard to computer access.

The present invention also facilitates the classification of individuals based on behavioral passwords. Classification may include user separation and clustering. User separation can be realized through the use of classical image and audio processing to identify multiple users present before the natural computing system. Subsequent verification is based on the use of a behavioral password consisting of a sequence of intentionally produced gestures (gesture pin) and, optionally, speech. Additionally, face recognition may be concurrently employed.

User clustering can also be realized through the use of classical image and audio processing. For example, morphological features extracted via a stereo camera system can be utilized to cluster people according to the extracted features. In such a case, people with white hair may be associated with a particular cluster corresponding to older individuals. More sophisticated implementations of the present invention incorporating behavioral passwords in combination with additional biometric features may detect other characteristics associated with a particular group in order to obtain proper clusters via classical clustering algorithms applied to the biometric features. Further, as stated above, a gesture included in a gesture pin (which is further included in a behavioral password) may consist of displaying an item (proof of possession) to verify ownership and thus identity. Accordingly, an item such as, for example, an ID card or PDA may have imbedded therein a means for indicating association with a particular cluster.

In accordance with the clustering aspect of the present invention, user preferences associated with a particular group may be automatically invoked. For example, if an older person is detected, the text size in a display and the volume in an output speaker may be increased. If sounds are incorporated in the behavioral password, a user's first language preference with respect to the operating system he is interfacing with may be varied based on the spoken utterance during a recognition session. That is, the language of the operating system of the computer may be matched to the language of the words spoken as part of a behavioral password.

It is to be appreciated that the present invention is not limited to application in natural computing environments and can be advantageously implemented for any scenario where an intended user must be identified and verified prior to performing, or being allowed to perform, a certain act (e.g., access a service or facility). Further, the present invention may be utilized to identify and verify an individual prior to providing the individual with an object, such as a paycheck or other goods. For example, an individual entering a classified area of a military base or other restricted area may be recognized based on the use of behavioral pins. The individual may be required to enter a sealed room where he performs a sequence of gestures which are processed and compared to previously stored data in order to determine if he is authorized to access the restricted area. Intentional sounds may be uttered during the performance of the gesture pin which are also compared to previously stored data (speaker recognition). In this way, the user may be recognized based on performance of a sequence of gestures only known to him and his acoustic characteristics.

It is to be appreciated that an individual may be recognized through the implementation of gesture recognition, where the gestures are unintentionally performed. For example, consider that a security system is in place at a facility to detect unauthorized personnel which have already bypassed initial security measures intended to prevent an initial entry into the facility. The security system is designed to detect individuals as they move about the grounds of the facility by extracting features of the individuals without the knowledge or active participation of the individuals. Such features may be compared against pre-stored features corresponding to a closed set of enrolled personnel. Such features may include unintentional gestures such as gait. Additionally, features such as thermal scans, height and hair color can be extracted to verify if the combination of features (gait, thermal print, height, and hair color) match an enrolled user. Further, an embodiment of the present invention may be implemented where certain gestures are stored which do not correspond to a particular individual but instead indicate emotions such as nervousness. Accordingly, the stereo camera system 501c may be utilized to detect and extract such gestures (e.g., tapping a hand or finger against a leg while walking, wiping one's brow, biting one's cuticles, etc.) so that additional recognition techniques (thermal scan, etc) may be implemented with respect to that individual. The above examples directed to non-computer applications can also be utilized in homes and other items such as boats.

Consider another example where a PDA or a digital wallet implements a combination of sound and gesture recognition to verify an authorized user. In such a case, a behavioral password consists of the tapping sounds generated when an authorized user taps the PDA or wallet in a predefined sequence. Moreover, the finger gestures associated with the tapping sequence are sensed by a touch pad (or other means). If a higher degree of accuracy is desired in the recognition process, the user's fingerprints may also be extracted while he is tapping. This embodiment may be implemented for larger items such as entering a facility or accessing an automobile. The above embodiment could be implemented in place of the numerical keypad currently used in many new automobiles.

It is to be understood that the present invention is not limited to the recognition of individuals based on behavioral passwords consisting of intentionally performed gestures and sounds, and unintentionally performed associated movements and sounds. Additional biometric and/or non-biometric features may also be implemented in a recognition method or apparatus in accordance with the present invention. It is to be further understood that the examples of biometric and non-biometric features described herein in relation to the present invention are not intended to be exhaustive, but rather illustrative, and other types of features may be employed. Further, while the present invention is directed to providing recognition of individuals in a natural computing environment it may also be implemented in any scenario to where recognition of an individual is required prior to the individual's access to a service, facility or goods.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for controlling access of an individual to one of a computer and a service and a facility, the method comprising the steps of:
   pre-storing a predefined sequence of intentional gestures performed by the individual during an enrollment session;
   extracting the predefined sequence of intentional gestures from the individual during a recognition session; and
   comparing the pre-stored sequence of intentional gestures to the extracted sequence of intentional gestures to recognize the individual; and
   wherein the method further comprises the steps of:
      determining whether the individual has performed any accidental movements more than a predetermined number of times during a plurality of recognition sessions; and
      adding the accidental movements to the predefined sequence of intentional gestures, when the individual has performed the accidental movements more than the predetermined number of times.

2. The method of claim 1, further comprising the step of identifying the accidental movements as optional in recognizing the individual during said comparing step.

3. A method for controlling access of an individual to one of a computer and a service and a facility, the method comprising the steps of:
   pre-storing a predefined sequence of intentional gestures performed by the individual during an enrollment session;
   extracting the predefined sequence of intentional gestures from the individual during a recognition session; and
   comparing the pre-stored sequence of intentional gestures to the extracted sequence of intentional gestures to recognize the individual; and
   wherein the method further comprises the step of, during the recognition session, identifying the predefined sequence of intentional gestures within a larger sequence of gestures performed by the individual by using pre-specified visually observable gestures to respectively indicate a beginning and an end of the predefined sequence of intentional gestures.

4. The method of claim 3, wherein the predefined sequence of intentional gestures used to recognize the individual comprise a sequence of actions that include the individual tapping an object in a pre-specified manner.

5. The method of claim 4, wherein at least one fingerprint of the individual is extracted from the individual while the individual is tapping, to recognize the individual based on the at least one fingerprint.

6. The method of claim 3, wherein said comparing step uses semantic gesture units corresponding to the predefined sequence of intentional gestures to recognize the individual.

7. An apparatus for controlling access of an individual to one of a computer and a service and a facility, the apparatus comprising the steps of:
   means for pre-storing a predefined sequence of intentional gestures performed by the individual during an enrollment session;
   means for extracting the predefined sequence of intentional gestures from the individual during a recognition session; and
   means for comparing the pre-stored sequence of intentional gestures to the extracted sequence of intentional gestures to recognize the individual,
   wherein said apparatus further comprises:
      means for digitizing video input data corresponding to the extracted sequence of intentional gestures to obtain a string of digitized image frames;
      means for segmenting the string of frames into sub-strings of frames that represent single gestures; and
      means for concatenating the sub-strings of frames associated with an encompassing single gesture; and
   wherein the segmenting means further comprises:
      means for comparing each digitized image frame in the string of frames with a library of gestures to associated the digitized image frame with a single gesture;
      means for utilizing predefined criteria to determine the digitized image frame in the string of frames that represents an end of a single gesture; and
      means for defining a sub-string of frames other than a first sub-string of frames as the frame representing the end of the single gesture, a beginning frame preceding the frame representing the end of a next single gesture, and the frames therebetween.

8. The apparatus of claim 7, wherein the first sub-string of frames is defined as a first digitized image frame in the string of frames, the frame representing the end of the single gesture, and the frames therebetween.

9. An apparatus for controlling access of an individual to one of a computer and a service and a facility, the apparatus comprising:
   means for pre-storing a predefined sequence of intentional gestures performed by the individual during an enrollment session;
   means for extracting the predefined sequence of intentional gestures from the individual during a recognition session; and
   means for comparing the pre-stored sequence of intentional gestures to the extracted sequence of intentional gestures to recognize the individual; and wherein the apparatus further comprises:
means for pre-storing at least one non-biometric feature associated with the individual during the enrollment session;
means for extracting the at least one non-biometric feature from the individual during the recognition session; and
means for comparing the pre-stored at least one non-biometric feature to the extracted at least one non-biometric feature to recognize the individual; and
wherein the at least one non-biometric feature comprises at least one synthesized sound outside of a range of human hearing.

10. An apparatus for controlling access of an individual to one of a computer and a service and a facility, the apparatus comprising:
means for pre-storing a predefined sequence of intentional gestures performed by the individual during an enrollment session;
means for extracting the predefined sequence of intentional gestures from the individual during a recognition session; and
means for comparing the pre-stored sequence of intentional gestures to the extracted sequence of intentional gestures to recognize the individual; and
wherein the predefined sequence of intentional gestures comprises a sequence of hand signals performed in an enclosure that restricts visibility to the sequence of hand signals.

11. An apparatus for controlling access of an individual to one of a computer and a service and a facility, the apparatus comprising:
means for pre-storing a predefined sequence of intentional gestures performed by the individual during an enrollment session;
means for extracting the predefined sequence of intentional gestures from the individual during a recognition session; and
means for comparing the pre-stored sequence of intentional gestures to the extracted sequence of intentional gestures to recognize the individual; and
wherein the apparatus further comprises:
means for determining whether the individual has performed any accidental movements more than a predetermined number of times during a plurality of recognition sessions; and
means for adding the accidental movements to the predefined sequence of intentional gestures, when the individual has performed the accidental movements more than the predetermined number of times.

12. The apparatus of claim 11, further comprising means for identifying the accidental movements as optional in recognizing the individual to said means for comparing.

13. An apparatus for controlling access of an individual to one of a computer and a service and a facility, the apparatus comprising:
means for pre-storing a predefined sequence of intentional gestures performed by the individual during an enrollment session;
means for extracting the predefined sequence of intentional gestures from the individual during a recognition session; and
means for comparing the pre-stored sequence of intentional gestures to the extracted sequence of intentional gestures to recognize the individual; and wherein the apparatus further comprises, during the recognition session, means for identifying the predefined sequence of intentional gestures within a larger sequence of gestures performed by the individual by using pre-specified visually observable gestures to respectively indicate a beginning and an end of the predefined sequence of intentional gestures.

14. An apparatus for controlling access of an individual to one of a computer and a service and a facility, the apparatus comprising the steps of:
means for pre-storing a predefined sequence of intentional gestures performed by the individual during an enrollment session;
means for extracting the predefined sequence of intentional gestures from the individual during a recognition session; and
means for comparing the pre-stored sequence of intentional gestures to the extracted sequence of intentional gestures to recognize the individual; and
wherein the apparatus further comprises:
means for representing each frame corresponding to the predefined sequence of intentional gestures as a vector; and
means for clustering the frames, wherein said clustering step comprises the step of replacing a similar sequence of vectors corresponding to a single gesture with a same number of identical vectors to reduce a number of different vectors per the single gesture.

15. The method of claim 3, wherein a gesture in the sequence of intentional gestures is one of touching an object, touching a body part, and waving.

16. The method of claim 3, further comprising the steps of:
digitizing video input data corresponding to the extracted sequence of intentional gestures to obtain a string of digitized image frames;
segmenting the string of frames into sub-strings of frames that represent single gestures; and
concatenating the sub-strings of frames associated with an encompassing single gesture.

17. The method of claim 16, further comprising the step of clustering vectors that represent the individual in a similar position into a respective cluster.

18. The method of claim 17, wherein the clustering step further comprises the step of replacing each vector in a respective cluster by a single cluster vector having a group value associated therewith.

19. The method of claim 18, wherein the group value of the single cluster vector is an average of the values of the vectors in the respective cluster.

20. The method of claim 17, wherein the clustering step further comprises the step of replacing the vectors in a respective cluster by a single cluster vector having a group value associated therewith.

21. The method of claim 20, wherein the group value of the single cluster vector is an average of the values of the vectors in the respective cluster.

22. A method for controlling access of an individual to one of a computer and a service and a facility, the method comprising the steps of:
pre-storing a predefined sequence of intentional gestures performed by the individual during an enrollment session;
extracting the predefined sequence of intentional gestures from the individual during a recognition session; and
comparing the pre-stored sequence of intentional gestures to the extracted sequence of intentional gestures to recognize the individual, wherein said method further comprises the steps of:
digitizing video input data corresponding to the extracted sequence of intentional gestures to obtain a string of digitized image frames;
segmenting the string of frames into sub-strings of frames that represent single gestures; and
concatenating the sub-strings of frames associated with an encompassing single gesture; and
wherein the segmenting step further comprises the steps of:
comparing each digitized image frame in the string of frames with a library of gestures to associated the digitized image frame with a single gesture;
utilizing predefined criteria to determine the digitized image frame in the string of frames that represents an end of a single gesture; and
defining a sub-string of frames other than a first sub-string of frames as the frame representing the end of the single gesture, a beginning frame preceding the frame representing the end of a next single gesture, and the frames therebetween.

23. The method of claim 22, wherein the first sub-string of frames is defined as a first digitized image frame in the string of frames, the frame representing the end of the single gesture, and the frames therebetween.

24. The method of claim 3, wherein the individual is considered recognized if the predefined sequence of intentional gestures substantially matches the extracted sequence of intentional gestures.

25. The method of claim 3, wherein the predefined sequence of intentional gestures comprise visually observable gestures, and said method further comprises the steps of:
pre-storing at least one characteristic associated with the performance of the visually observable gestures performed during the enrollment session;
extracting the at least one characteristic from the individual during the recognition session; and
comparing the pre-stored at least one characteristic to the extracted at least one characteristic to recognize the individual.

26. The method of claim 25, wherein the at least one characteristic is one of a speed of performing at least one gesture of the gesture sequence, a speed of transitioning from a first gesture to a second gesture, and a speed of performing the entire gesture sequence.

27. The method of claim 3, further comprising the steps of:
pre-storing at least one unintentional gesture associated with, and performed during, the performance of the intentional gesture sequence of the enrollment session;
extracting the at least one unintentional gesture from the individual during the recognition session; and
comparing the pre-stored at least one unintentional gesture to the extracted at least one unintentional gesture to recognize the individual.

28. The method of claim 27, wherein the at least one unintentional gesture is a result of one of reflex and habit with respect to the performance of the intentional gesture sequence.

29. The method of claim 27, further comprising the steps of:
pre-storing at least one characteristic associated with the performance of the one unintentional gesture performed during the enrollment session;
extracting the at least one characteristic from the individual during the recognition session; and comparing the pre-stored at least one characteristic to the extracted at least one characteristic to recognize the individual.

30. The method of claim 29, wherein the at least one characteristic is one of a speed of performing the at least one unintentional gesture.

31. The method of claim 3, further comprising the steps of:
pre-storing at least one biometric feature associated with the individual during the enrollment session;
extracting the at least one biometric feature from the individual during the recognition session; and
comparing the pre-stored at least one biometric feature to the extracted at least one biometric feature to recognize the individual.

32. The method of claim 31, wherein the at least one biometric feature is one of voice print, face recognition, signature recognition, face temperature infrared pattern, lip reading, writing instrument velocity, writing instrument pressure, fingerprint, retinal print, body geometry, and body part geometry.

33. The method of claim 3, further comprising the steps of:
pre-storing at least one non-biometric feature associated with the individual during the enrollment session;
extracting the at least one non-biometric feature from the individual during the recognition session; and
comparing the pre-stored at least one non-biometric feature to the extracted at least one non-biometric feature to recognize the individual.

34. The method of claim 33, wherein the at least one non-biometric feature is one of a password, a personal identification number (PIN), and personal information.

35. The apparatus of claim 11, wherein a gesture in the sequence of intentional gestures is one of touching an object, and touching a body part.

36. The apparatus of claim 11, further comprising:
(a) a digitizer for digitizing video input data corresponding to the extracted sequence of intentional gestures to obtain a string of digitized image frames;
(b) means for segmenting the string of frames into sub-strings of frames that represent single gestures; and
(c) means for concatenating the sub-strings of frames associated with an encompassing single gesture.

37. The method of claim 36, further comprising the step of clustering the digitized image frames that represent the individual in a similar position into a respective cluster.

38. The apparatus of claim 11, wherein the predefined sequence of intentional gestures comprise visually observable gestures, and said apparatus further comprises:
means for pre-storing at least one characteristic associated with the performance of the visually observable gestures performed during the enrollment session;
means for extracting the at least one characteristic from the individual during the recognition session; and
means for comparing the pre-stored at least one characteristic to the extracted at least one characteristic to recognize the individual.

39. The apparatus of claim 38, wherein the at least one characteristic is one of a speed of performing at least one gesture of the gesture sequence, a speed of transitioning from a first gesture to a second gesture, and a speed of performing the entire gesture sequence.

40. The apparatus of claim 11, further comprising:
means for pre-storing at least one unintentional gesture associated with, and performed during, the performance of the intentional gesture sequence of the enrollment session;

means for extracting the at least one unintentional gesture from the individual during the recognition session; and means for comparing the pre-stored at least one unintentional gesture to the extracted at least one unintentional gesture to recognize the individual.

41. The apparatus of claim 40, wherein the at least one unintentional gesture is a result of one of reflex and habit with respect to the performance of the intentional gesture sequence.

42. The apparatus of claim 40, further comprising:

means for pre-storing at least one characteristic associated with the performance of the one unintentional gesture performed during the enrollment session;

means for extracting the at least one characteristic from the individual during the recognition session; and means for comparing the pre-stored at least one characteristic to the extracted at least one characteristic to recognize the individual.

43. The apparatus of claim 42, wherein the at least one characteristic is one of a speed of performing the at least one unintentional gesture.

44. The apparatus of claim 11, further comprising:

means for pre-storing at least one biometric feature associated with the individual during the enrollment session;

means for extracting the at least one biometric feature from the individual during the recognition session; and means for comparing the pre-stored at least one biometric feature to the extracted at least one biometric feature to recognize the individual.

45. The apparatus of claim 11, further comprising:

means for pre-storing at least one non-biometric feature associated with the individual during the enrollment session;

means for extracting the at least one non-biometric feature from the individual during the recognition session; and means for comparing the pre-stored at least one non-biometric feature to the extracted at least one non-biometric feature to recognize the individual.

46. A method for controlling access of an individual to one of a computer and a service and a facility, the method comprising the steps of:

pre-storing a predefined sequence of intentional gestures performed by the individual during an enrollment session;

extracting the predefined sequence of intentional gestures from the individual during a recognition session; and comparing the pre-stored sequence of intentional gestures to the extracted sequence of intentional gestures to recognize the individual; and wherein the method further comprises the steps of:
pre-storing at least one non-biometric feature associated with the individual during the enrollment session;
extracting the at least one non-biometric feature from the individual during the recognition session; and
comparing the pre-stored at least one non-biometric feature to the extracted at least one non-biometric feature to recognize the individual; and
wherein the at least one non-biometric feature comprises at least one synthesized sound outside of a range of human hearing.

47. A method for controlling access of an individual to one of a computer and a service and a facility, the method comprising the steps of:

pre-storing a predefined sequence of intentional gestures performed by the individual during an enrollment session;

extracting the predefined sequence of intentional gestures from the individual during a recognition session; and comparing the pre-stored sequence of intentional gestures to the extracted sequence of intentional gestures to recognize the individual; and wherein the predefined sequence of intentional gestures comprises a sequence of hand signals performed in an enclosure that restricts visibility to the sequence of hand signals.

48. A method for controlling access of an individual to one of a computer and a service and a facility, the method comprising the steps of:

pre-storing a predefined sequence of intentional gestures performed by the individual during an enrollment session;

extracting the predefined sequence of intentional gestures from the individual during a recognition session; and comparing the pre-stored sequence of intentional gestures to the extracted sequence of intentional gestures to recognize the individual; and wherein the method further comprises the steps of:
representing each frame corresponding to the predefined sequence of intentional gestures as a vector; and
clustering the frames, wherein said clustering step comprises the step of replacing a similar sequence of vectors corresponding to a single gesture with a same number of identical vectors to reduce a number of different vectors per the single gesture.

49. The method of claim 3, wherein the predefined sequence of intentional gestures is unrelated to handwriting, and said method further comprises the step of comparing frames corresponding to the predefined sequence of intentional gestures with a library of basic positions to identify gestures within the predefined sequence of intentional gestures.

50. The method of claim 3, wherein the sequence of intentional gestures is unrelated to handwriting, and said comparing step comprises the step of comparing a representation of the predefined sequence of intentional gestures to Hidden Markov Models (HMMs) that model a user performing a particular gesture that is also unrelated to the handwriting.

51. The method of claim 3, further comprising the steps of:

representing each frame corresponding to the predefined sequence of intentional gestures as a vector;

clustering the frames into clusters;

segmenting the clusters into strokes, wherein a stroke is a series of images that represent a user performing a particular gesture; and concatenating strokes to form gesture symbols based on Hidden Markov Models (HMMs), each of the HMMs having a plurality of states and a plurality of output arcs, wherein the plurality of states correspond to a set of strokes, and the plurality of output arcs correspond to labels for the set of strokes.

52. The method of claim 5, further comprising the step of interpreting strings of gesture symbols as a semantic unit.

53. The method of claim 3, further comprising the step of identifying pre-specified visually detectable gestures that mark a beginning and an end of the predefined sequence of gestures.

* * * * *